(12) United States Patent
Ohsawa et al.

(10) Patent No.: US 10,964,934 B2
(45) Date of Patent: Mar. 30, 2021

(54) LAMINATE TYPE BATTERY AND METHOD FOR PRODUCING THE SAME

(71) Applicant: NISSAN MOTOR CO., LTD., Yokohama (JP)

(72) Inventors: Yasuhiko Ohsawa, Kanagawa (JP); Hajime Satou, Kanagawa (JP); Hiroshi Akama, Kanagawa (JP); Hideaki Horie, Kanagawa (JP); Yusuke Mizuno, Kyoto (JP); Hiroshi Fukumoto, Kyoto (JP); Masatoshi Okura, Kyoto (JP); Yasuhiro Shindo, Kyoto (JP); Yasuhiro Tsudo, Kyoto (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 616 days.

(21) Appl. No.: 15/505,729

(22) PCT Filed: Aug. 21, 2015

(86) PCT No.: PCT/JP2015/073460
§ 371 (c)(1),
(2) Date: Feb. 22, 2017

(87) PCT Pub. No.: WO2016/031688
PCT Pub. Date: Mar. 3, 2016

(65) Prior Publication Data
US 2017/0279113 A1 Sep. 28, 2017

(30) Foreign Application Priority Data

Aug. 25, 2014 (JP) .............................. JP2014-170622
Aug. 25, 2014 (JP) .............................. JP2014-170626

(51) Int. Cl.
*H01M 4/139* (2010.01)
*H01M 10/04* (2006.01)
(Continued)

(52) U.S. Cl.
CPC ......... *H01M 4/139* (2013.01); *H01M 4/0404* (2013.01); *H01M 4/62* (2013.01);
(Continued)

(58) Field of Classification Search
None
See application file for complete search history.

(56) References Cited

U.S. PATENT DOCUMENTS

| 8,445,139 B2 | 5/2013 | Hosaka et al. |
| 2012/0208082 A1* | 8/2012 | Honda ................ H01M 4/60 |
| | | 429/210 |

FOREIGN PATENT DOCUMENTS

| JP | 2006-190649 A | 7/2006 |
| JP | 2010-251159 A | 11/2010 |
| JP | 2011-60560 A | 3/2011 |

* cited by examiner

Primary Examiner — Carmen V Lyles-Irving
(74) Attorney, Agent, or Firm — Foley & Lardner LLP

(57) ABSTRACT

A laminate type battery includes a power generating element and an outer casing body. The power generating element is formed by electrically laminating in series a plurality of single battery layers in which a single battery layer is formed by sequentially laminating a positive electrode current collector, a positive electrode active material layer, an electrolyte layer, a negative electrode active material layer, and a negative electrode current collector. The power generating element is disposed inside the outer casing body. At least one of the positive electrode current collector or the negative electrode current collector includes a resin layer having conductivity. The single battery layer including the resin (Continued)

layer is electrically connected to an adjacent single battery layer via at least one resistance reduction layer.

8 Claims, 7 Drawing Sheets

(51) Int. Cl.
    *H01M 4/66* (2006.01)
    *H01M 50/44* (2021.01)
    *H01M 50/46* (2021.01)
    *H01M 50/502* (2021.01)
    *H01M 50/528* (2021.01)
    *H01M 4/04* (2006.01)
    *H01M 4/62* (2006.01)
    *H01M 10/0525* (2010.01)
    *H01M 10/058* (2010.01)

(52) U.S. Cl.
    CPC ............. *H01M 4/66* (2013.01); *H01M 4/661* (2013.01); *H01M 4/667* (2013.01); *H01M 10/04* (2013.01); *H01M 10/058* (2013.01); *H01M 10/0525* (2013.01); *H01M 50/44* (2021.01); *H01M 50/461* (2021.01); *H01M 50/502* (2021.01); *H01M 50/528* (2021.01); *H01M 4/668* (2013.01)

LAMINATE TYPE BATTERY AND METHOD FOR PRODUCING THE SAME

TECHNICAL FIELD

The present invention relates to a laminate type battery and a method for producing the same.

BACKGROUND ART

In recent years, expectations are growing for widespread use of various electric vehicles with a view to solving environment and energy problems. As a key to wide spread use of these electric vehicles, vigorous development of secondary batteries as an in-vehicle power source such as a power source for driving a motor is under way. However, in order for the electric vehicles to gain wide acceptance, the batteries need to have higher performance and be less expensive. Further, there is a need for the single-charge travel distance of the electric vehicles to approach that of gasoline engine vehicles, giving rise to the demand for batteries having higher energy density. Therefore, particularly, non-aqueous electrolyte secondary batteries such as secondary batteries expecting a high capacity and high output are attracting attention.

Further, various studies on respective members (a current collector, an active material layer, and the like) of the above-described secondary batteries have been made in order to further improve output characteristics of batteries such as higher output. For example, in order to improve output density per weight of a secondary battery, in JP 2006-190649 A (corresponding to US 2008/220330 A), it has been proposed that a current collector containing a polymer material and a conductive filler (hereinafter, also referred to as the "resin current collector") is used as a current collector of a bipolar type secondary battery.

SUMMARY OF INVENTION

However, in the technique described in JP 2006-190649 A (corresponding to US 2008/220330 A), the output of the battery is not sufficient and thus there is further demand for improvement in output characteristics.

In this regard, an object of the present invention is to provide a means for improving output characteristics in a laminate type secondary battery.

Solution to Problem

The present inventors conducted intensive studies. As a result, the present inventors found that the above-described problems can be solved by providing, at the outer surface side of a single battery layer including a resin layer having conductivity, a resistance reduction layer adjacent to the resin layer in a laminate type battery formed by laminating a plurality of single battery layers.

That is, according to the present invention, there is provided a laminate type battery including a power generating element formed by electrically laminating in series a plurality of single battery layers in which the single battery layer is formed by sequentially laminating a positive electrode current collector, a positive electrode active material layer, an electrolyte layer, a negative electrode active material layer, and a negative electrode current collector. In the laminate type battery, the power generating element is disposed in an outer casing body. Herein, at least one of the positive electrode current collector and the negative electrode current collector includes a resin layer having conductivity. Further, the laminate type battery further includes a resistance reduction layer adjacent to the resin layer at the outer surface side of the single battery layer including the resin layer.

DESCRIPTION OF EMBODIMENTS

Figure 1:
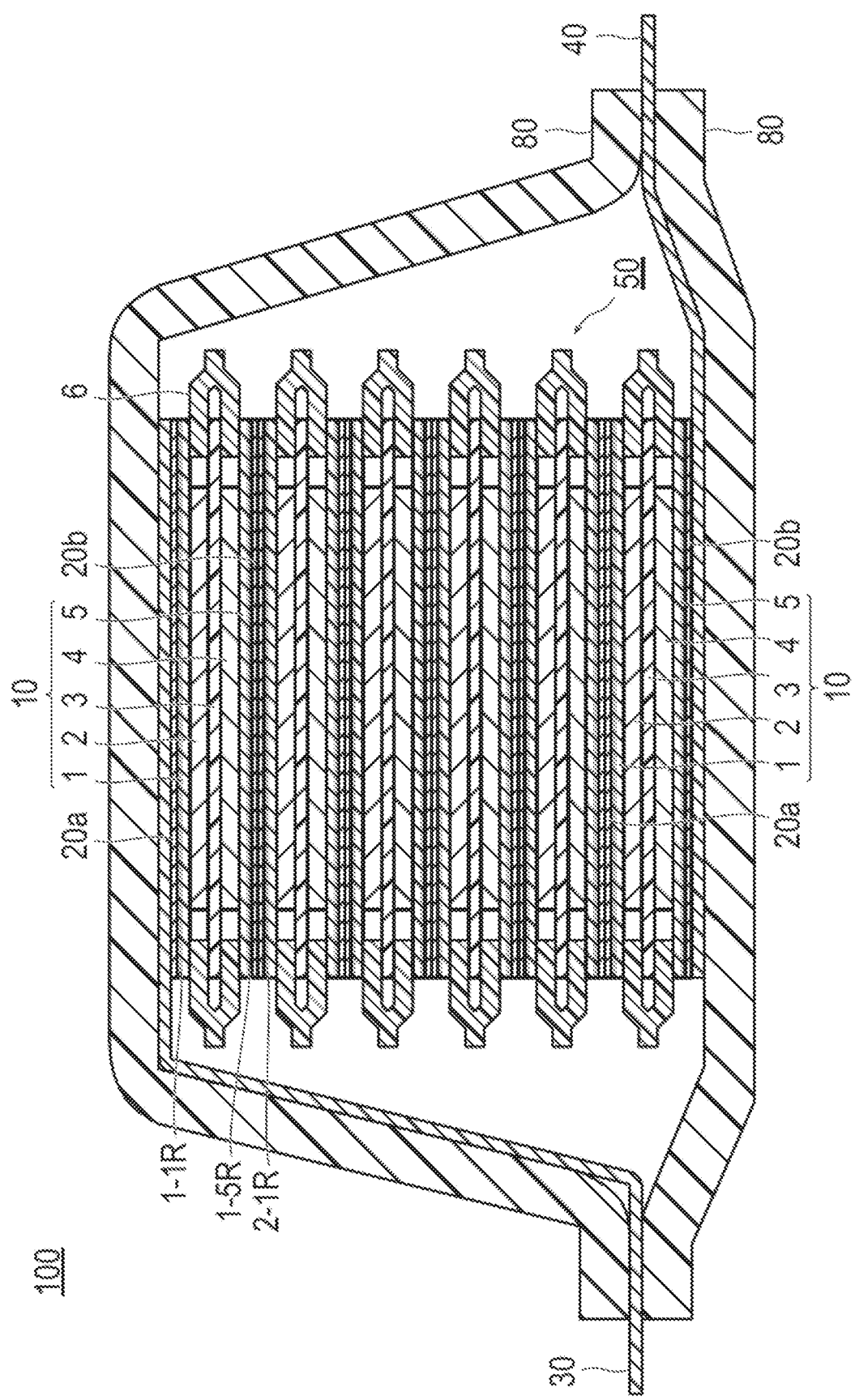
FIG. 1 is a schematic cross-sectional view schematically illustrating a laminate (flat) non-bipolar type lithium ion secondary battery according to a first embodiment of the present invention.

Hereinafter, embodiments according to the present invention will be described. However, the present invention is not limited to the following embodiments. Incidentally, the same reference numerals are assigned to the same elements in the description of the drawings, and duplicate descriptions are omitted. In addition, the scale of the drawings includes some exaggeration for descriptive reasons, and may thus be different from the actual dimension.

<<Laminate Type Battery>>

The present invention relates to a laminate type battery formed by sealing a power generating element, which is formed by electrically laminating in series a plurality of single battery layers, each of single battery layers is formed by sequentially laminating a positive electrode current collector, a positive electrode active material layer, an electrolyte layer, a negative electrode active material layer, and a negative electrode current collector, in an outer casing body. That is, the present invention relates to a laminate type battery formed by sealing a power generating element, which is formed by electrically connecting in series the single battery layers, in an outer casing body. At least one of the positive electrode current collector and the negative electrode current collector includes a resin layer having conductivity. Further, a resistance reduction layer adjacent to the resin layer is disposed at the outer surface side of the single battery layer including the resin layer. Incidentally, in the present specification, the resin layer having conductivity is also simply referred to as the "conductive resin layer" or the "resin layer."

The "resistance reduction layer" means a layer which achieves a smaller internal resistance of the battery when the resistance reduction layer is disposed, as compared to a case where the resin layer and another member sealed in the outer casing body are connected to each other without via the resistance reduction layer. Herein, "another member" described above specifically means a member, which may be electrically connected to the resin layer, such as the current collector or the current collecting plate constituting the single battery layer. When such a resistance reduction layer is disposed to be adjacent to the resin layer included in the positive electrode current collector and/or the negative electrode current collector, as compared to the laminate type battery of the related art, the internal resistance is significantly reduced, and as a result, the output characteristics are improved.

The resistance reduction layer may be disposed at the outer surface side of the single battery layer to be adjacent to at least one resin layer, and various arrangement forms can be employed. For example, both surfaces of the resistance reduction layer may be disposed to be adjacent to the resin layers. That is, such an arrangement form is a form in which the single battery layer is electrically connected to the adjacent single battery layer via the resistance reduction layer. Further, the battery according to the present invention may further include a pair of current collecting plates which interposes the power generating element and is electrically connected to outermost layer current collectors disposed at the outermost of the power generating element. Further, in the configuration in which at least one of the outermost layer current collectors includes an outermost resin layer, the resistance reduction layer may be disposed between the outermost resin layer and the current collecting plate. That is, such an arrangement form is a form in which the single battery layer disposed at the outermost side is electrically connected to the current collecting plate via the resistance reduction layer.

Hereinafter, the above-described embodiment will be described by means of examples. Incidentally, the present invention is not limited to the embodiment to be described below, and various embodiments are possible within the scope of the present invention. The laminate type battery is preferably a laminate type lithium ion secondary battery. Hereinafter, the structure of the laminate type lithium ion secondary battery according to this embodiment will be described. Incidentally, in the present specification, the laminate type lithium ion secondary battery is simply referred to as the "laminate type battery" in some cases.

First Embodiment: Non-Bipolar Type Secondary Battery

A first embodiment of the present invention relates to a laminate type (flat type) battery formed by sequentially laminating a power generating element which is formed by laminating a plurality of single battery layers so as to be electrically connected in series, as illustrated in FIG. 1. In addition, a resistance reduction layer is disposed between the plurality of single battery layers. When the resistance reduction layer is disposed, the resistance reduction layer is formed by a conductive material which achieves a smaller internal resistance of the battery as compared to a case where the single battery layers (more specifically, the conductive resin layers constituting the single battery layers) are connected to each other without via the resistance reduction layer. The resistance reduction layer preferably contains a material having an electrical resistivity smaller than that of the conductive resin layer adjacent to the resistance reduction layer.

In this embodiment, the laminate type battery is preferably a secondary battery that has a form in which the single battery layers are laminated in series and is not a bipolar type battery having a bipolar type electrode (that is, a non-bipolar type battery). Herein, the term "non-bipolar type" means that the battery does not have a bipolar type electrode. Hereinafter, the structure of a non-bipolar type lithium ion secondary battery according to this embodiment will be described.

FIG. 1 is a cross-sectional view schematically illustrating a laminate (flat) non-bipolar type battery according to an embodiment of the present invention.

As illustrated in FIG. 1, a laminate type battery 100 of this embodiment has a structure in which a power generating element 50 with a substantially rectangular shape, in which a charge and discharge reaction actually occurs, is sealed inside a laminate film 80 serving as an outer casing body. Herein, the power generating element 50 is formed by laminating a plurality of single battery layers 10, each of which is formed by laminating a positive electrode current collector 1, a positive electrode active material layer 2, an electrolyte layer 3, a negative electrode active material layer 4, and a negative electrode current collector 5 in this order. Further, the power generating element 50 further includes resistance reduction layers 20a and 20b, which are respectively adjacent to the positive electrode current collector 1 and the negative electrode current collector 5, at the outer surface sides of the single battery layer 10. In the single battery layer 10, a sealing portion 6 is provided at the outer periphery of the electrolyte layer 3.

In the power generating element 50, the single battery layers 10 adjacent to each other are laminated to be electrically connected in series. That is, the positive electrode current collector 1 of one single battery layer 10 and the negative electrode current collector 5 of another single battery layer 10 are adjacently laminated so as to be electrically connected. In this way, the power generating element 50 included in the laminate type battery 100 according to this embodiment has the configuration in which the plurality of single battery layers 10 are electrically connected in series, thereby achieving higher voltage as in the case of the bipolar type secondary battery.

In FIG. 1, the power generating element 50 formed by laminating six single battery layers 10 is illustrated, but when the power generating element 50 is produced, the number of the single battery layers 10 laminated (the number of the laminated layers) is appropriately adjusted depending on a desired voltage.

Figure 2:
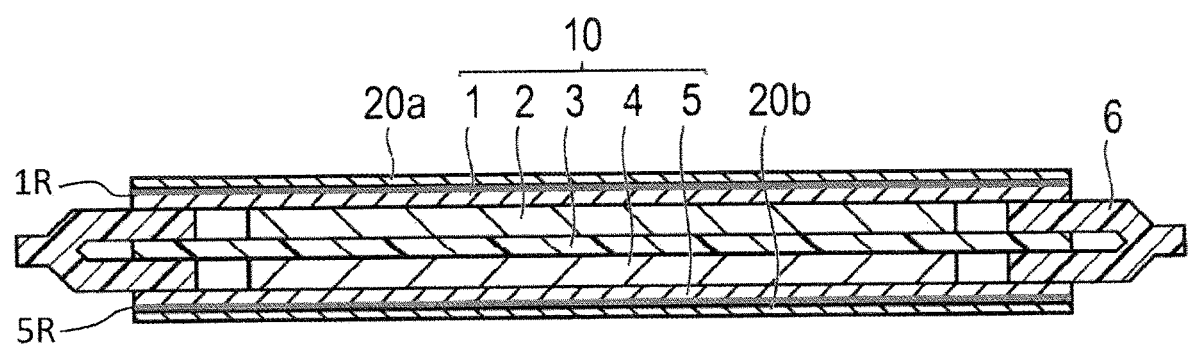
FIG. 2 is a cross-sectional view schematically illustrating a single battery layer included in the laminate type battery of FIG. 1.

In the laminate type battery 100 of this embodiment, the plurality of positive electrode current collectors 1 and negative electrode current collectors 5 are resin current collectors each having a conductive resin layer (e.g., a conductive resin layer 1-1R, a conductive resin layer 1-5R, and a conductive resin layer 2-1R in FIG. 1, and a conductive resin layer 1R and a conductive resin layer 5R in FIG. 2). In this way, by using the resin current collectors, lightness of the laminate type battery 100 can be achieved.

Further, in the laminate type battery 100 of this embodiment, the resistance reduction layers 20a and 20b, which are respectively adjacent to the positive electrode current collector 1 and the negative electrode current collector 5, are formed at the outer surfaces of the single battery layers 10 adjacent to each other, and the single battery layers adjacent to each other are laminated via the resistance reduction layers 20a and 20b. In addition, the resistance reduction layers 20a and 20b are respectively disposed between the power generating element 50 formed by laminating the plurality of single battery layers 10, and each of a positive electrode current collecting plate 30 and a negative electrode current collecting plate 40. Incidentally, in the laminate type battery 100 according to the present invention, there is no need that all single battery layers 10 are necessarily laminated via the resistance reduction layers 20a and 20b, and it is sufficient that the single battery layer including the resin current collector is electrically connected to the adjacent single battery layer via the resistance reduction layer.

Further, the resistance reduction layer interposed between the single battery layers adjacent to each other may be one layer. When the single battery layers 10 are laminated via one layer of the resistance reduction layer, lightness of the laminate type battery 100 can be achieved and an interface can be reduced, which is preferable in terms of durability.

That is, in the laminate type battery 100 of this embodiment, it is sufficient that at least one single battery layer including the resin current collector is electrically connected to the adjacent single battery layer via at least one resistance reduction layer.

The laminate type battery 100 having the above-described configuration is excellent in production efficiency since the single battery layers 10 which can independently function are laminated, as compared to the bipolar type secondary battery. For example, the production of the bipolar type secondary battery, which is formed by laminating a plurality of bipolar type electrodes, as exemplified in JP 2005-276486 A is conducted mainly through processes as described below. First, a positive electrode active material layer is formed on one surface of a current collector and a negative electrode active material layer is formed on the other surface thereof to thereby produce a bipolar type electrode. Then, a plurality of the bipolar type electrodes are laminated via a separator to form a power generating element and then the power generating element is sealed in an outer casing body, thereby producing a bipolar type secondary battery.

In this regard, the bipolar type secondary battery produced by using the bipolar type electrodes has a problem that, for example, even when there is a defect in a part of the bipolar type electrodes, it is not possible to determine there is a defect until the finally obtained bipolar type secondary battery is evaluated. Therefore, in the bipolar type secondary battery having the power generating element formed by electrically laminating in series the bipolar type electrodes, a yield at the time of producing the battery may not be favorable in some cases.

In this regard, the present inventors investigated, as another embodiment (configuration) of a secondary battery, a laminate type battery having a noble configuration in which a plurality of single battery layers are laminated in series, and each of single battery layers has a positive electrode current collector, a positive electrode active material layer, an electrolyte layer, a negative electrode active material layer, and a negative electrode current collector. Since in such a laminate type battery, in contrast to the bipolar type secondary battery described above, each single battery layer (single cell) can be prepared and the battery characteristics can be evaluated for each single battery layer, each single battery layer can be evaluated at the stage before the power generating element 50 of the laminate type battery is constructed. Therefore, since the single battery layer 10 having a defect can be excluded in this course, there are advantages in that a yield at the time of production is favorable and productivity is excellent.

Further, in order to improve output characteristics, the present inventors tried to apply a resin current collector disclosed in JP 2006-190649 A (corresponding to US 2008/220330 A) to the laminate type battery obtained by laminating the single battery layers. Doing this, the present inventors found that there is a problem that sufficient output characteristics are still not obtained only by simply applying the resin current collector to the laminate type battery having the above-described configuration. That is, when the single battery layers 10 each including the resin current collector are laminated, it is found that by employing only the configuration in which the single battery layers 10 are directly laminated, output characteristics are not sufficient. In this regard, the present inventors specifically investigated this problem, and as a result, they estimated that a high contact resistance between the resin current collector constituting one single battery layer 10 and the current collector constituting another single battery layer 10 (may be a resin current collector) is one cause of this problem.

Figure 4:
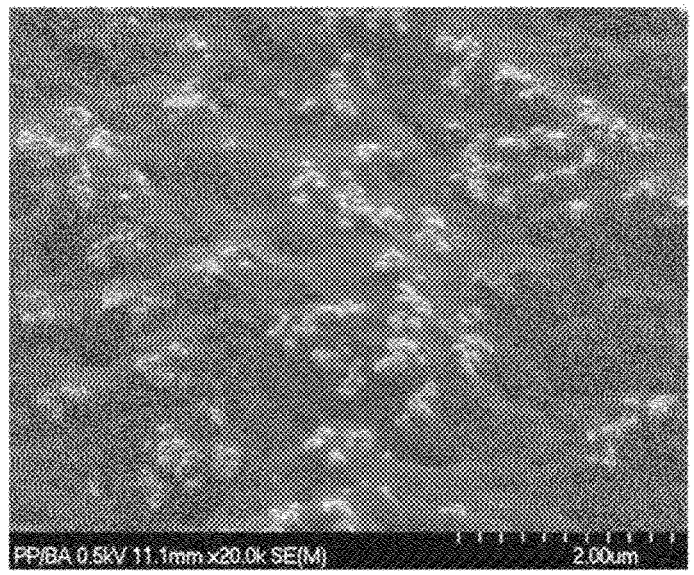
FIG. 4 is a scanning electron microscope (SEM) photograph obtained by observing the surface of a resin layer formed by polypropylene and containing 20% by mass of acetylene black from the upper 45° direction.

For this reason, the present inventors focused on the electrical contact between the current collectors. In FIG. 4, the surface of the resin current collector containing polypropylene (PP) serving as a polymer material and acetylene black serving as a conductive filler is observed as an example of the resin current collector. More specifically, FIG. 4 is a scanning electron microscope (SEM) photograph obtained by observing the surface of a resin formed by polypropylene (PP) and containing 20% by mass of acetylene black serving as a conductive filler from the upper 45° direction with respect to the horizontal direction. In FIG. 4, those observed as white are acetylene black and those observed as black are polypropylene. As seen from FIG. 4, unevenness with a size of about 1 μm is present on the surface of PP constituting the current collector, and acetylene black is exposed at parts of the unevenness. Further, there is "waviness" in the entire resin current collector when the resin current collector is microscopically observed, and it is found that the resin current collector does not necessarily have a uniformly smooth surface.

From such an observation result, the present inventors estimated as follows. That is, due to unevenness present on the surface of the resin current collector including the conductive resin layer or the waviness of the resin current collector itself, a contact area between the positive electrode current collector 1 of one single battery layer 10 and the negative electrode current collector 5 of the single battery layer 10 adjacent to the one single battery layer 10 is reduced when the single battery layers 10 are laminated. Therefore, the surface of the resin current collector only can be partially in point contact with another current collector, and sufficient contact cannot be performed two-dimensionally and three-dimensionally. As a result, when the resin current collector is used, it is estimated that the electrical connection is difficult to achieve and the contact resistance may be increased.

Figure 5:
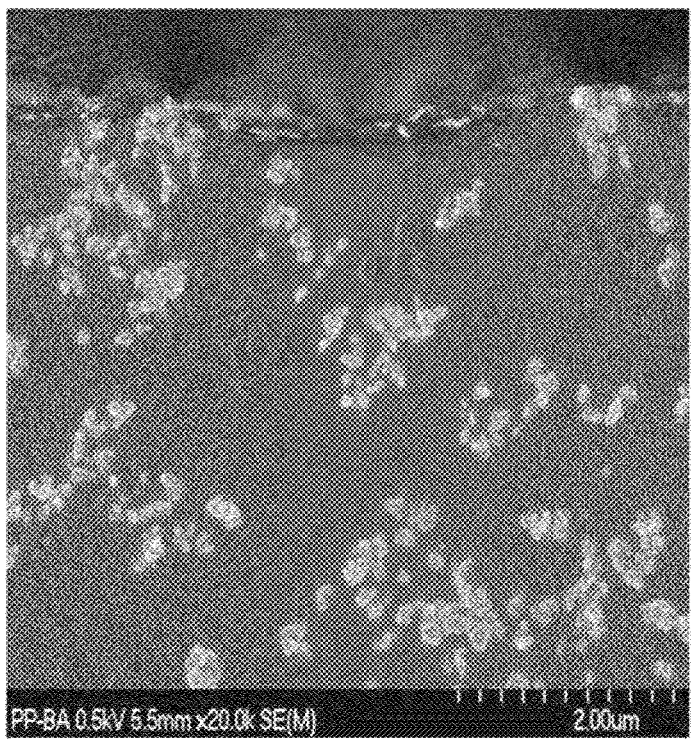
FIG. 5 is a photograph obtained by observing the cross-section of the resin layer illustrated in FIG. 4 with a SEM.

FIG. 5 is a photograph obtained by observing the cross-section of the same current collector in the same manner with a SEM. It is found that a lot of acetylene black is present inside the current collector and a proportion of acetylene black exposed on the surface is small. Therefore, as compared to a case where the resin constituting the resin current collector contains a conductive polymer, when the resin contains a polymer having no conductivity and a conductive filler such as acetylene black, a problem of the contact resistance described above is considered to be more significant.

Further, from such an observation result, the present inventors estimated that since the resin current collector and a member adjacent to the resin current collector (another resin current collector or a current collecting plate) are partially in point contact with each other and cannot be sufficiently in contact with each other two-dimensionally or three-dimensionally, the electrical connection is less likely to be achieved, and thus the contact resistance may be increased. In addition, the present inventors estimated that in the point contact, the electrical connection becomes unstable, for example, the resin current collector is separated from the current collecting plate by vibration, and there is a case where the performance of the battery cannot be maintained (durability is poor).

The present inventors conducted intensive studies in order to solve such problems. As a result, they found that by employing at least one of the following configurations (a) and (b), the two-dimensional/three-dimensional contact between the conductive resin layer (the resin current collector) and the member adjacent to the resin layer (another resin current collector or a current collecting plate) is increased, the electrical connection is improved, and thus the contact resistance is reduced:

(a) the resin current collector and another current collector (a resin current collector) are laminated via the resistance reduction layer; and (b) the resistance reduction layer is disposed on the surface of the conductive resin layer constituting the outermost layer current collector (that is, between the power generating element and the current collecting plate).

Figure 6:
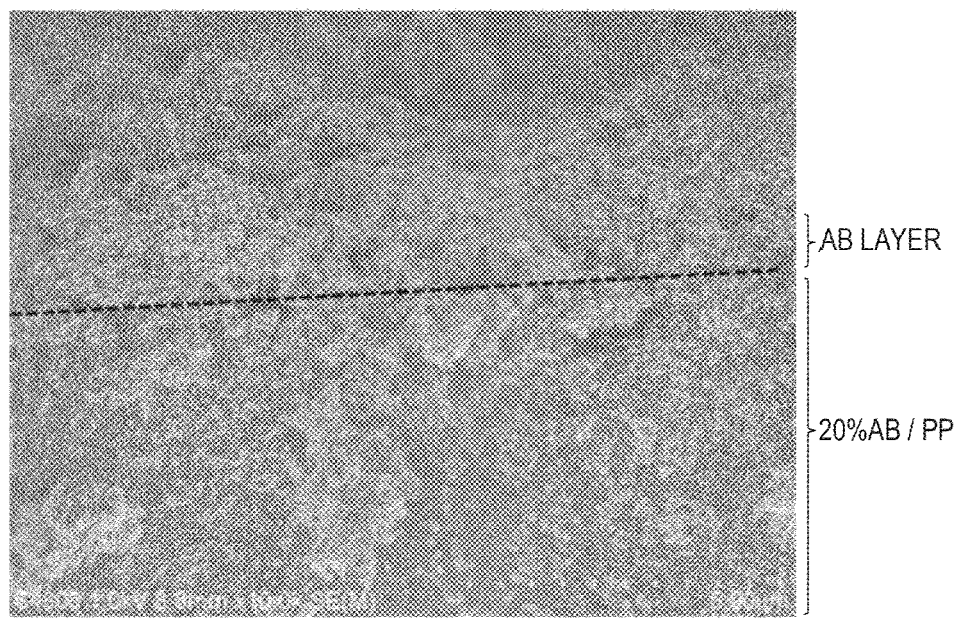
FIG. 6 is a cross-sectional SEM photograph showing an electrode having an acetylene black layer as a resistance reduction layer on the surface of a resin layer formed by polypropylene and containing 20% by mass of acetylene black.

FIG. 6 is a cross-sectional SEM photograph showing a part of an electrical connection structure in which an acetylene black layer is provided as a resistance reduction layer on the surface of a resin current collector formed by polypropylene and containing 20% by mass of acetylene black. In an electrical connection structure portion shown in FIG. 6, it is found that acetylene black (AB) in the resin current collector ("20% AB/PP" in FIG. 6) and the acetylene black layer ("AB layer" in FIG. 6) provided on the surface of the resin current collector are in close contact with each other. In this way, when the resistance reduction layer such as the AB layer is disposed between the single battery layers, the two-dimensional/three-dimensional contact between the current collector including a conductive resin layer and the current collector laminated on the current collector including a conductive resin layer is increased, and thus the contact resistance can be reduced.

Figure 7:
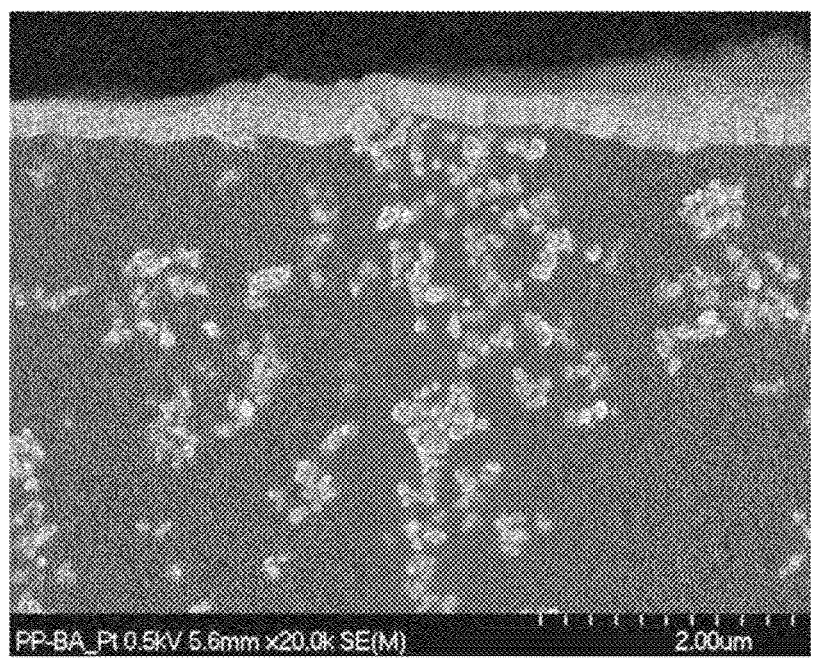
FIG. 7 is a photograph obtained by observing the cross-section of an outermost layer current collector provided with a resistance reduction layer formed by platinum deposited by vapor deposition on the surface of a resin layer formed by polypropylene and containing 20% by mass of acetylene black with a SEM.

Further, FIG. 7 is a SEM photograph showing the cross-section of an outermost layer current collector provided with a resistance reduction layer formed by platinum by vapor deposition on the surface of a resin layer formed by polypropylene and containing 20% by mass of acetylene black. In FIG. 7, it is found that acetylene black (AB) in the resin layer and the resistance reduction layer provided on the resin layer are in close contact with each other. When such a resistance reduction layer is provided, the two-dimensional/three-dimensional contact between the resin layer containing a conductive filler and the current collecting plate is increased, and thus the contact resistance can be reduced. According to this, the internal resistance of the battery can be reduced, and the output characteristics can be improved.

Incidentally, the above description is merely presumption, and the present invention is not limited to the above description.

Incidentally, in FIG. 1, a configuration in which all single battery layers 10 are laminated via the resistance reduction layers 20a and 20b is illustrated, but the present invention is not limited to the above-described form. It is sufficient that a single battery layer including a resin current collector and a single battery layer adjacent to the single battery layer including a resin current collector are laminated via a resistance reduction layer in a laminate type battery. However, from the viewpoint of lightweight and production efficiency, all of the positive electrode current collector 1 and the negative electrode current collector 5 are preferably resin current collectors. Therefore, in the laminate type battery 100, preferably, resistance reduction layers are disposed between all single battery layers 10. In this configuration, it is preferable that both surfaces of the resistance reduction layer are disposed to be adjacent to the positive electrode current collector 1 and the negative electrode current collector 5. Incidentally, in FIG. 1, an embodiment in which two resistance reduction layers 20a and 20b are disposed between the single battery layers 10 adjacent to each other is illustrated; however, from the functional viewpoint, the resistance reduction layers 20a and 20b are regarded as one layer, and the configuration of FIG. 1 is also included in the "embodiment in which both surfaces of the resistance reduction layer are disposed to be adjacent to the conductive resin layers."

Further, the resistance reduction layer may be disposed not only between the single battery layers 10 but also between the positive electrode current collector 1 and the positive electrode active material layer 2 or between the negative electrode current collector 5 and the negative electrode active material layer 4. That is, a first positive electrode resistance reduction layer may be formed on one surface of the positive electrode current collector 1 and a second positive electrode resistance reduction layer and the positive electrode active material layer 2 may be sequentially formed on the other surface thereof. In addition, similarly, a first negative electrode resistance reduction layer may be formed on one surface of the negative electrode current collector 5 and a second negative electrode resistance reduction layer and the negative electrode active material layer 4 may be sequentially formed on the other surface thereof. With such an embodiment, the contact resistance between each active material layer and the current collector can be reduced.

Since the power generating element 50 is easily influenced by external damage at the time of operation and environmental degradation, there is a need to prevent external damage at the time of operation and environmental degradation. Therefore, the power generating element 50 is sealed in the laminate film 80 under reduced pressure. Further, it is preferable to employ a structure in which the positive electrode current collecting plate 30 and the negative electrode current collecting plate 40 are extended to the outside of the laminate film 80.

In FIG. 1, the positive electrode current collector 1 (the outermost layer current collector), which is disposed at the uppermost portion of the single battery layer 10, and the negative electrode current collector 5 (the outermost layer current collector), which is disposed at the lowermost portion of the single battery layer 10, are laminated on the positive electrode current collecting plate 30 and the negative electrode current collecting plate 40 via a resistance reduction layer 20a and a resistance reduction layer 20b, respectively. That is, the resistance reduction layer 20a is provided between the positive electrode current collector 1 (the outermost layer current collector) and the positive electrode current collecting plate 30, and the resistance reduction layer 20b is disposed between the negative electrode current collector 5 (the outermost layer current collector) and the negative electrode current collecting plate 40. Further, FIG. 1 illustrates a structure in which these positive electrode current collecting plate 30 and negative electrode current collecting plate 40 are extended to the outside of the laminate film 80 such that the positive electrode current collecting plate and the negative electrode current collecting plate are respectively interposed by the end portions of the laminate film 80. Moreover, as another embodiment, it is possible to employ a structure in which the positive electrode-side and negative electrode-side outermost layer current collectors formed at the outermost layers of the power generating element 50 are respectively extended and the extended portions are exposed on the outside of the laminate film 80 such that the exposed portions are respectively interposed by the end portions of the laminate film 80.

The laminate type battery 100 of this embodiment has a feature that the single battery layers 10 constituting the power generating element 50 are each independently formed and each of the single battery layers 10 can function as a secondary battery. Hereinafter, the single battery layers 10 constituting the power generating element 50 of the laminate type battery 100 will be described with reference to FIG. 2. FIG. 2 is a cross-sectional view schematically illustrating the single battery layer included in the laminate type battery of FIG. 1.

As illustrated in FIG. 2, the single battery layer 10 of the laminate type battery 100 according to this embodiment has a configuration in which a positive electrode, the electrolyte layer 3, and a negative electrode are laminated. The positive electrode has a structure in which the positive electrode active material layer 2 is disposed on one surface of the positive electrode current collector 1. The negative electrode has a structure in which the negative electrode active material layer 4 is disposed on one surface of the negative electrode current collector 5. Further, in the single battery layer 10, one positive electrode active material layer 2 and the negative electrode active material layer 4 adjacent to the positive electrode active material layer 2 face each other via the electrolyte layer 3 so that the negative electrode, the electrolyte layer, and the positive electrode are laminated in this order. That is, the single battery layer 10 has a structure in which the positive electrode current collector 1, the positive electrode active material layer 2, the electrolyte layer 3, the negative electrode active material layer 4, and the negative electrode current collector 5 are sequentially laminated. According to this structure, the positive electrode, the electrolyte layer 3, and the negative electrode constitute one single battery layer 10 and the battery characteristics can be evaluated only with the single battery layer 10. As a result, the single battery layer 10 having a defective portion can be excluded before the power generating element 50 is assembled, and a yield in production of the laminate type battery 100 can be improved.

Incidentally, as will be described later in detail, the type (form) of the electrolyte layer 3 is not particularly limited. For example, the electrolyte layer 3 can also be applied to any one of a liquid electrolyte type battery in which a separator is impregnated with a non-aqueous electrolyte liquid, a polymer gel electrolyte type battery and a solid polymer electrolyte (all-solid-state electrolyte) type battery which are also called a polymer battery. The polymer gel electrolyte and the all-solid-state electrolyte can be used alone or these polymer gel electrolyte and solid-polymer electrolyte can be impregnated into a separator and be used. In such a form, as illustrated in FIG. 1, the sealing portion 6 is preferably provided at the outer periphery of the electrolyte layer 3. When the sealing portion 6 is provided, it is possible to prevent liquid junction caused by leakage of the electrolyte liquid from the electrolyte layer 3. When the sealing portion 6 is disposed, it is possible to ensure long-term reliability and safety and to provide the laminate type battery 100 with high quality.

Hereinafter, each member constituting the laminate type battery 100 according to this embodiment will be described.

Incidentally, the term "current collector" described in the present specification indicates both or only one of the positive electrode current collector and the negative electrode current collector. Similarly, the term "active material layer" described herein indicates both or only one of the positive electrode active material layer and the negative electrode active material layer. Similarly, the term "active material" described herein indicates both or only one of the positive electrode active material and the negative electrode active material.

[Current Collector (Resin Layer Having Conductivity)]

The current collector serves as a medium for transferring electrons from one surface to the other surface.

At least one of the plurality of single battery layers constituting the laminate type battery according to this embodiment has a resin current collector including a conductive resin layer from the viewpoint of lightness of the battery. Therefore, in the laminate type battery, it is sufficient that at least one of the positive electrode current collector and the negative electrode current collector is a resin current collector including a conductive resin layer. Note that, from the viewpoint of lightness and production efficiency, it is preferable that the positive electrode current collector and the negative electrode current collector in one single battery layer be resin current collectors. Moreover, it is more preferable that the positive electrode current collector and the negative electrode current collector in all of the single battery layers constituting the laminate type battery be resin current collectors.

Herein, the problem of the contact resistance caused by unevenness or waviness on the surface of the resin current collector becomes particularly significant when both the current collectors to be laminated are resin current collectors. However, as described above, the problem of the contact resistance can be solved by electrically connecting the single battery layer including the resin current collector and another single battery layer adjacent to the single battery layer including the resin current collector via the resistance reduction layer. Therefore, it is possible to obtain the effect of lightness by the resin current collector and to further improve output characteristics.

In this embodiment, a material for forming the conductive resin layer may be a conductive polymer or a polymer having no conductivity. A resin obtained by adding a conductive filler as necessary to the conductive polymer or the polymer having no conductivity is used. In addition, the polymer can be used alone or can be used as a mixture of two or more kinds thereof. Further, the polymer may be a commercially available product or a synthesis product.

The conductive polymer can be selected from materials that have conductivity but do not allow conduction of ions used as a charge transfer medium. It is considered that these conductive polymer show conductivity by the formation of an energy band with a conjugated polyene system thereof.

There can be used a conductive polyene-based polymer that is known as a typical example of a conductive polymer and has been proceeding toward practical use in an electrolytic condenser or the like. Specific examples of such a conductive polymer include polyaniline, polypyrrole, polythiophene, polyacetylene, polyparaphenylene, polyphenylenevinylene, polyoxadiazole, and mixtures thereof. From the viewpoint of electron conductivity and stable use in battery, polyaniline, polypyrrole, polythiophene, and polyacetylene are more preferable.

Examples of the polymer material having no conductivity include polyethylene (PE) (high-density polyethylene (HDPE), low-density polyethylene (LDPE), or the like), polypropylene (PP), polystyrene (PS), polyethylene terephthalate (PET), polyether nitrile (PEN), polyimide (PI), polyamide (PA), polyamide imide (PAI), polytetrafluoroethylene (PTFE), styrene-butadiene rubber (SBR), polyacrylonitrile (PAN), polymethyl acrylate (PMA), polymethylmethacrylate (PMMA), polyvinyl chloride (PVC), polyvinylidene fluoride (PVdF), polyvinylidene chloride (PVDC), and mixtures thereof. These materials have a very large potential window to be stable to both of positive and negative potentials and save weight for improvement in battery output density. Among them, from the viewpoint of durability with respect to the electrolyte liquid to be used, various polyolefins, such as polypropylene and polyethylene, or a copolymer and mixture thereof are preferable.

Further, the conductive resin layer preferably contains a conductive filler for the purpose of improving the conductivity of the resin current collector containing a conductive polymer material or for the purpose of imparting conductivity to the resin current collector containing a polymer material having no conductivity. The conductive filler is selected from materials having conductivity. Preferably, from the viewpoint of suppressing the ion transmission in the conductive resin layer, a material having no conductivity with respect to ions used as a charge transfer medium is preferably used.

Specifically, a carbon material, aluminum (Al), gold (Au), silver (Ag), copper (Cu), iron (Fe), platinum (Pt), chromium (Cr), tin (Sn), indium (In), antimony (Sb), titanium (Ti), nickel (Ni), and the like are exemplified, but the materials are not limited thereto. These conductive fillers may be used alone or in combination of two or more kinds thereof. Further, alloy materials thereof such as stainless steel (SUS) may be used. From the viewpoint of corrosion resistance, aluminum, stainless steel, a carbon material, or nickel is preferable, a carbon material or nickel is more preferable, and a carbon material is particularly preferable. Furthermore, these conductive fillers may be in the form of a particulate ceramic material or resin material coated therearound with a metal described above by plating or the like.

As the carbon material, for example, at least one selected from the group consisting of acetylene black, carbon black, Vulcan (registered trademark), Black Pearls (registered trademark), carbon nanofiber, Ketjen black (registered trademark), carbon nanotube, carbon nanohorn, carbon nanoballoon, and hard carbon is mentioned. These carbon materials have a very large potential window to be stable to both of positive and negative potentials in a wide range and are excellent in conductivity. Further, since the carbon materials are very lightweight, mass increase is minimized. Moreover, the carbon materials are often also used as a conductive aid for the electrode, and thus even when the carbon materials are brought into contact with the conductive aid, the carbon materials exhibit very low contact resistance due to the use of the same carbon material. Incidentally, when the carbon material is used as a conductive filler, it is feasible to subject the surface of the carbon material to hydrophobic treatment so as to decrease the compatibility of the electrolyte to the current collector and thereby make it unlikely that the electrolyte will penetrate into pores of the current collector.

Incidentally, when the battery of this embodiment is a lithium ion secondary battery and the charge-discharge potential of the negative electrode active material is close to the deposition potential of Li, insertion of Li ions occurs in the conductive filler such as carbon material by charging and discharging and thus the conductive filler is expanded. For this reason, there is possibility that the current collector may be damaged (damages are caused to the current collector). Therefore, for the conductive filler of the current collector facing the negative electrode, a material which does not cause lithiation, such as Ni, Cu, Fe, or SUS, is preferable. In addition, a conductive filler whose surface is coated with these materials can be also preferably used.

The shape of the conductive filler is not particularly limited, and a conventionally-known shape such as a granular shape, a powder shape, a fiber-like shape, a plate-like shape, a lump shape, a cloth shape, or a mesh-like shape can be selected appropriately. For example, when conductivity is intended to be provided in a wide range, a conductive filler having a granular shape is preferably used. On the other hand, when conductivity is intended to be further improved in a specific direction, a conductive filler having a shape such as a fiber-like shape and a constant directionality.

The average particle diameter of the conductive filler (the average particle diameter of the primary particles) is not particularly limited, but is preferably 0.01 to 10 µm and more preferably about 0.01 to 1 µm. Incidentally, in the present specification, unless otherwise stated, the "particle diameter" means the greatest length L between any two points on the circumference of the particle. For a value of the "average particle diameter," a value is employed which is calculated with an observation means, such as a scanning electron microscope (SEM) or a transmission electron microscope (TEM), as an average value of particle diameters of the particles observed in several to several tens of fields of view.

When the conductive filler has a fiber-like shape, the average fiber length thereof is not particularly limited, but is preferably 0.1 to 100 µm. Incidentally, in the present specification, for the average fiber length, a value is employed which is calculated with an observation means, such as a scanning electron microscope (SEM) or a transmission electron microscope (TEM), as an average value of fiber lengths of the fibers observed in several to several tens of fields of view. Further, when the conductive filler has a fiber-like shape, the average diameter thereof is calculated in the same manner as described above. The average diameter is also not particularly limited, but is preferably 0.01 to 1 µm.

The content of the polymer material in the conductive resin layer is not particularly limited. When the conductive filler is contained in the conductive resin layer together with the polymer material, the content of the polymer material is preferably 10 to 95 parts by mass, more preferably 12 to 95 parts by mass, further preferably 12 to 90 parts by mass, further preferably 50 to 90 parts by mass, and particularly preferably 60 to 90 parts by mass relative to 100 parts by mass of the total amount of the polymer material and the conductive filler in the conductive resin layer.

Further, the content of the conductive filler in the conductive resin layer is also not particularly limited. However, the content of the conductive filler is preferably 5 to 90 parts by mass, more preferably 5 to 88 parts by mass, further preferably 5 to 50 parts by mass, and particularly preferably 10 to 40 parts by mass relative to 100 parts by mass of the total amount of the polymer material and the conductive filler in the conductive resin layer. When such an amount of the conductive filler is added to the polymer material, sufficient conductivity can be imparted to the current collector while an increase in mass of the current collector is suppressed.

In the conductive resin layer, other additives may be contained in addition to the polymer material and the conductive filler. Examples of the other additives include carboxylic acid-modified polypropylene such as maleic anhydride modified polypropylene. The added amount of the other additives is not particularly limited, but is preferably 1 to 25 parts by mass relative to 100 parts by mass of the total amount of the polymer material and the conductive filler.

The thickness of the conductive resin layer is preferably 1 to 200 µm, more preferably 3 to 150 µm, and further preferably 5 to 100 µm.

The method for producing a conductive resin layer is not particularly limited, and for example, a method is mentioned in which each component of a polymer material, a conductive filler, and as necessary, an additive is melted and kneaded by an extruder or the like and the melted-and-kneaded material is subjected to rolling by a heat pressing device.

Incidentally, the current collector (the conductive resin layer) may have a single layer structure or a laminate structure obtained by appropriately combining layers formed by these materials. Alternatively, the current collector may have another layer in addition to the resin current collector. As another layer, for example, a metal layer is mentioned. The metal layer is preferable from the viewpoint of blocking the movement of lithium ions between the single battery layers.

Further, when the single battery layer includes a resin current collector, one of two current collectors constituting the single battery layer may be a current collector other than a resin current collector, for example, may be a metal current collector. When the positive electrode current collector or the negative electrode current collector is a metal current collector, a known metal current collector can be used. For example, the metal current collector is preferably formed by at least one or more selected from the group consisting of aluminum, tantalum, niobium, titanium, hafnium, zirconium, zinc, tungsten, bismuth, antimony, an alloy containing at least one or more of these materials, and a stainless alloy. Furthermore, the thickness of the current collector is not particularly limited, and the same thickness as a well-known thickness or an appropriately-changed thickness can be employed.

[Resistance Reduction Layer]

In the laminate type battery according to this embodiment, the single battery layer including a resin current collector having a conductive resin layer is electrically connected to another single battery layer via the resistance reduction layer disposed to be adjacent to the resin current collector of the single battery layer. Therefore, the resistance reduction layer is disposed between the positive electrode current collector of one single battery layer and the negative electrode current collector of another single battery layer to be abutted to each current collector. With the configuration, the resistance reduction layer can be electrically connected to the current collector efficiently and stably, and thus it is possible to reduce the contact resistance and improve the output performance of the battery.

The resistance reduction layer of this embodiment is formed by a conductive material which achieves a smaller internal resistance of the battery as compared to a case where the resin layer and another member sealed in the outer casing body (specifically, a member which can be electrically connected to the resin layer, such as a current collector constituting another single battery layer or a current collecting plate) are connected to each other without via the resistance reduction layer. The present invention is made on the basis that the present inventors first found that unevenness of the surface of the resin layer having conductivity causes a decrease in output characteristics of the battery. Therefore, the conductive material for forming the resistance reduction layer can be used without any limitation as long as it reduces the internal resistance of the battery (that is, reduces the contact resistance between the resin layer and another member which can be electrically connected to the resin layer).

The electrical resistance between the resin layer and another member which can be electrically connected to the resin layer can vary depending on factors such as a material for forming the resin layer, the current collecting plate or a member interposed between the resin layer and the current collecting plate, the thicknesses thereof and the contact resistance or the contact pressure among the resin layer, the current collecting plate and a member interposed between the resin layer and the current collecting plate, which are adjacent to each other, and unevenness of the resin layer. Among these factors, particularly, by appropriately selecting the conductive material for forming the resistance reduction layer, the laminate type secondary battery of the present invention can be easily produced.

The material of the resistance reduction layer (also referred to as the "conductive material" in the present specification) is not particularly limited, but the resistance reduction layer preferably contains a material having an electrical resistivity smaller than that of the positive electrode current collector or the negative electrode current collector adjacent to the resistance reduction layer. When such a material is contained, the contact resistance between the resistance reduction layer and the resin current collector is reduced, and as a result, the output characteristics of the laminate type battery can be improved. Moreover, for the purpose of reducing the internal resistance of the laminate type battery and improving the output characteristics, the volume resistivity of the resistance reduction layer is preferably smaller than that of the positive electrode current collector or the negative electrode current collector adjacent to the resistance reduction layer.

As a more preferred embodiment, a contact resistance of the conductive material which forms the resistance reduction layer of this embodiment with the conductive resin layer adjacent to the resistance reduction layer is 2Ω or less. The contact resistance is more preferably 1Ω or less, further preferably 0.7Ω or less, particularly preferably 0.5Ω or less, and most preferably 0.25Ω or less. When the resistance reduction layer formed by such a material is used, the internal resistance of the battery can be further reduced. Incidentally, in the present specification, for the contact resistance between the resistance reduction layer and the resin current collector (the conductive resin layer), a value measured by the method described in Examples described later is employed. Further, a small value of the contact resistance is preferable.

In particular, when the resin current collector contains a conductive filler, it is preferable to use a conductive material having a small contact resistance with the conductive filler. Therefore, the resistance reduction layer preferably contains a metal material or a carbon material (conductive carbon). The metal material and the carbon material have a small contact resistance with the aforementioned resin current collector and thus are suitably used as a material for forming the resistance reduction layer. Of them, a metal is preferably used as the conductive material.

It is preferable that the resistance reduction layers each independently contain, as the conductive material, specifically, at least one material selected from the group consisting of iron (Fe); a metal, which has the ionization tendency smaller than iron (Fe), such as cadmium (Cd), cobalt (Co), nickel (Ni), tin (Sn), lead (Pb), antimony (Sb), bismuth (Bi), copper (Cu), silver (Ag), palladium (Pd), iridium (Ir), platinum (Pt), or gold (Au); titanium (Ti), zirconium (Zr), tantalum (Ta), and niobium (Nb); an alloy (such as stainless steel (SUS)) containing, as a main component, at least one element selected from these elements; and conductive carbon. Incidentally, the expression "containing as a main component" a certain element means that an element other than the element contained as a main component may be contained. In this case, the content of the specific element described above (iron; a metal which has the ionization tendency smaller than iron; and Ti, Zr, Ta, Nb, or the like) in the conductive material (when a plurality of elements are contained, the total amount thereof) is preferably as described below. That is, the content of the specific element described above is preferably 50% by mass or more, more preferably 60% by mass or more, further preferably 70% by mass or more, further preferably 80% by mass or more, particularly preferably 90 to 100% by mass, and most preferably 95 to 100% by mass relative to the total mass 100% by mass (the total mass of the alloy) of the conductive material.

The above-described materials are less likely to form an oxide film having insulating properties. Further, even when an oxide film is formed, resistance is small, and thus the electrical contact with the conductive filler contained in the resin layer can be maintained for a long time.

Furthermore, among the conductive materials, as a metal material, at least one material selected from the group consisting of nickel (Ni), copper (Cu), and titanium (Ti) is preferably included. Moreover, the resistance reduction layer is preferably formed by at least one material selected from the group consisting of nickel (Ni) and titanium (Ti).

In particular, it is preferable to form a resistance reduction layer by using a metal as a conductive material constituting the resistance reduction layer and by at least one method selected from the group consisting of vapor deposition, sputtering, ion plating, and plating. That is, according to a preferred embodiment of the present invention, the resistance reduction layer is formed by at least one method selected from the group consisting of vapor deposition, sputtering, ion plating, and plating, and is formed by a metal which achieves a smaller internal resistance of the battery as compared to a case where the resin layer and the current collecting plate are connected without via the resistance reduction layer. By providing such a resistance reduction layer, the contact between the resin layer and the current collector is increased, and thus the internal resistance of the battery can be reduced. In addition, since the resistance reduction layer can be produced to be sufficiently thin, it is possible to obtain a battery having a high energy density without interfering lightness of the power generating element (the single battery layer).

The vapor deposition method is not particularly limited, and examples thereof include a resistance heating method, an electron beam method, a high frequency induction method, and a laser method.

The sputtering method is not particularly limited, and examples thereof include a dipole DC glow discharge sputtering method, a magnetron sputtering method, and an ion-beam sputtering method.

The ion plating method is not particularly limited, and examples thereof include an RF ion plating method, a resistance heating ion plating method, and an electron beam ion plating method.

The plating method is not particularly limited, and examples thereof include an electroless plating method and a method of performing electrolytic plating after electroless plating.

Among these, from the viewpoint of ease of the process, a vapor deposition method and a sputtering method are preferable.

Further, specific examples of the conductive carbon include at least one selected from the group consisting of acetylene black, carbon black, Vulcan (registered trademark), Black Pearls (registered trademark), carbon nanofiber, Ketjen black (registered trademark), carbon nanotube, carbon nanohorn, carbon nanoballoon, and hard carbon.

Among the conductive materials described above, it is preferable to contain at least one selected from the group consisting of titanium, nickel, copper, gold, acetylene black, carbon nanotube, and carbon black.

When the conductive resin layer contains a conductive filler, the same material as that of the conductive filler can also be used as the conductive material. In this configuration, when the resistance reduction layer and the conductive filler are formed by the same material, the contact resistance can be reduced. Further, the conductive material may be appropriately selected depending on the positive electrode and the negative electrode.

Incidentally, the conductive material may be used alone or may be used as a mixture of two or more kinds thereof.

Further, the laminate type secondary battery of this embodiment may have a plurality of resistance reduction layers (for example, both the positive electrode-side and negative electrode-side outermost layer current collectors may be resistance reduction layers). In this case, the two resistance reduction layers may be formed by the same conductive materials as each other or different conductive materials from each other. In addition, the resistance reduction layer may be configured by a single layer or may have a configuration in which a plurality of layers are laminated. Moreover, as described layer, the resistance reduction layer may be a layer including a main body of a resistance reduction layer and a conductive adhesive member.

The microscopic shape of the conductive material for forming the resistance reduction layer is not particularly limited, and a conventionally-known shape such as a granular shape, a powder shape, a fiber-like shape, a plate-like shape, a lump shape, a cloth shape, or a mesh-like shape may be selected appropriately.

The average particle diameter of the conductive material (the average particle diameter of the primary particles) is not particularly limited, but is preferably 0.01 to 10 μm and more preferably about 0.01 to 1 μm. With such a size, the conductive material can effectively contact the uneven surface of the conductive resin layer. As a result, the electrical contact between the current collector and the resistance reduction layer can be further increased. Incidentally, in the present specification, the definition and the measurement method of "particle diameter" and "average particle diameter" are as explained above.

When the conductive material has a fiber-like shape, the average fiber length thereof is not particularly limited, but is preferably 0.1 to 100 μm. Incidentally, in the present specification, the measurement method of the "average fiber length" is as explained above. Further, when the conductive material has a fiber-like shape, the average diameter thereof is also not particularly limited, but is preferably 0.001 to 1 μm. With such a size, the fiber-like conductive material is effectively in contact with the unevenness of the surface of the current collector, and thus the electrical contact between the current collector and the resistance reduction layer can be further increased. Furthermore, when the conductive material has a fiber-like shape, two-dimensional (horizontal) electrical contact can be increased even when a small amount of the conductive material is added, which is preferable.

The resistance reduction layer may be formed only from the above-described conductive material or may contain other materials as described below.

For example, the resistance reduction layer may further contain a pressure sensitive adhesive, an adhesive, a conductive polymer, another polymer having no conductivity, or the like in addition to the above-described conductive material so long as the effect of the conductive material is not impaired. When conductive carbon is used as the conductive material, from the viewpoint of adhesiveness between the current collector and the resistance reduction layer, it is preferable that the resistance reduction layer further contain a pressure sensitive adhesive or an adhesive.

A pressure sensitive adhesive or adhesive which can be used in this embodiment is not particularly limited, but a known pressure sensitive adhesive or adhesive can be used. For example, an acrylic pressure sensitive adhesive/adhesive, a silicon-based pressure sensitive adhesive/adhesive, a vinyl ether-based pressure sensitive adhesive/adhesive, or the like is mentioned.

As the acrylic pressure sensitive adhesive/adhesive, copolymers of functional monomers such as n-butyl (meth)acrylate, hexyl (meth)acrylate, 2-diethylbutyl (meth)acrylate, isooctyl (meth)acrylate, 2-methoxyethyl (meth) acrylate, 2-ethylhexyl (meth)acrylate, decyl (meth)acrylate, dodecyl (meth)acrylate, tirdecyl (meth)acrylate, (meth) acrylic acid, itaconic acid, maleic acid, maleic anhydride, hydroxyethyl acrylate, hydroxypropyl acrylate, vinyl acetate, (meth)acrylamide, dimethyl (meth)acrylamide, methylaminoethyl (meth)acrylate, methoxyethyl (meth) acrylate, ethylene glycol di(meth)acrylate, tetraethylene glycol di(meth)acrylate, butanediol di(meth)acrylate, and trimethylol propane triacrylate can be used. Incidentally, the term "(meth)acrylate" described in the present specification indicates methacrylate and/or acrylate.

As specific examples of the silicon-based pressure sensitive adhesive/adhesive, those configured by a mixture and/or polymerized product of dimethyl siloxane gum and dimethyl siloxane resin can be used.

Specific examples of the vinyl ether-based pressure sensitive adhesive/adhesive include homopolymers such as ethyl vinyl ether, propyl vinyl ether, butyl vinyl ether, and 2-ethylhexyl vinyl ether and copolymers thereof.

Further, a conductive polymer which can be used together with the conductive material is not also particularly limited, and examples thereof include polyaniline, polypyrrole, polythiophene, polyacetylene, polyparaphenylene, polyphenylene-vinylene, polyacrylonitrile, and polyoxadiazole.

Furthermore, examples of a usable polymer having no conductivity include polyethylene (high-density polyethylene (HDPE), low-density polyethylene (LDPE), or the like), polypropylene, polystyrene, polyethylene terephthalate, polyether nitrile, polyimide, polyamide, polyamideimide, polytetrafluoroethylene, styrene-butadiene rubber, polyacrylonitrile, polymethyl acrylate, polymethylmethacrylate, polyvinyl chloride, polyvinylidene fluoride, and polyvinylidene chloride. The other components described above may be used alone or two or more kinds thereof may be mixed and used.

Moreover, as the pressure sensitive adhesive/adhesive, commercially available products may be used. For example, POLYTHICK 310-S, AH-311, 410-SA, 430-SA, 470-S, or 610-SA manufactured by Sanyo Chemical Industries, Ltd. can be used.

When the resistance reduction layer contains a material (a pressure sensitive adhesive, an adhesive, or the like) other than the conductive material, the content of the conductive material is preferably 2 to 90 parts by mass, more preferably 3 to 85 parts by mass, further preferably 5 to 75 parts by mass, and particularly preferably 5 to 60 parts by mass relative to the total mass of the resistance reduction layer. When the resistance reduction layer contains a pressure sensitive adhesive or the like in addition to the conductive material, adhesiveness between the current collector and the resistance reduction layer is improved, which is preferable.

The resistance reduction layer is provided on at least one surface of the current collector; however, regarding the shape of the plane direction thereof, the resistance reduction layer may be provided on the entire surface of the current collector or may be provided only at an area necessary for performing electrical contact with the conductive filler contained in the conductive resin layer. In addition, the resistance reduction layer may be provided on the other surface of the current collector in a range that it overlaps the active material layer disposed at one surface side of the current collector. Further, the resistance reduction layer may be continuously provided in the plane direction or may be partially or intermittently provided. Examples of the shape thereof include various shapes such as a mesh shape, a stripe shape, a lattice shape, a dot shape, and a band shape.

The thickness of the resistance reduction layer is not particularly limited, but when the resistance reduction layer is formed by a metal serving as the conductive material, the thickness thereof is preferably 5 to 10,000 nm (0.005 to 10 μm), more preferably 10 to 10,000 nm (0.01 to 10 μm), further preferably 50 to 5,000 nm (0.05 to 5 μm), further preferably 50 to 1,000 nm (0.05 to 1 μm), and further preferably 100 to 500 nm (0.1 to 0.5 μm). On the other hand, when the resistance reduction layer contains a conductive carbon serving as the conductive material, the thickness thereof is preferably 100 to 30,000 nm (0.1 to 30 μm). When the thickness thereof is adjusted to the above range, the resistance reduction layer can exhibit sufficient conductivity and the thickness can be prevented from unnecessarily increasing.

Further, the total basis weight of the resistance reduction layer (when the resistance reduction layer contains a plurality of materials, the total basis weight of these materials) is not particularly limited, but is preferably in a range described below. That is, the total basis weight of the resistance reduction layer is preferably 0.1 to 10 mg/cm$^2$, more preferably 0.5 to 5 mg/cm$^2$, and particularly preferably 1 to 3 mg/cm$^2$. When the total basis weight is adjusted to 0.1 mg/cm² or more, the resistance reduction layer exhibits sufficient conductivity. On the other hand, when the total basis weight is adjusted to 10 mg/cm² or less, the thickness is prevented from unnecessarily increasing, which contributes to lightness of the laminate type battery.

The method for forming the resistance reduction layer is not particularly limited, but for example, the resistance reduction layer can be formed by using a gas phase method (dry method) such as a vacuum vapor deposition method or a sputtering method, or a coating method (wet method) of applying a coating liquid containing a conductive material. Incidentally, the details of the method for forming the resistance reduction layer will be described in the section of the method for producing a laminate type battery described below.

Hereinafter, a preferred embodiment of portions (members), which constitutes the laminate type battery of the present invention, other than the resistance reduction layer and the current collector will be described; however, as the following respective members (an active material layer, an electrolyte layer, and an outer casing body), the same members as known members can be employed or members with appropriate modifications can be employed.

[Active Material Layer]

The active material layer contains an active material. Herein, the active material absorbs or releases ions during charge or discharge and generates electric energy. As the active material, there are a positive electrode active material having a constitution to absorb ions during discharge and release the ions during charge and a negative electrode active material having a constitution to release ions during discharge and absorb the ions during charge. The active material layer of this embodiment functions a positive electrode active material layer when the positive electrode active material is used as the active material and functions a negative electrode active material layer when the negative electrode active material is used. In the present specification, matters common to the positive electrode active material and the negative electrode active material will be described simply as the "active material."

A positive electrode active material include $LiMn_2O_4$, $LiCoO_2$, $LiNiO_2$, $Li(Ni-Mn-Co)O_2$, and lithium-transition metal composite oxide, such as a compound in which a part of these transition metals is replaced with another element, a lithium-transition metal phosphate compound, and a lithium-transition metal sulfate compound. The positive electrode active material may be used alone or may be used as a mixture of two or more kinds thereof. From the viewpoint of capacity and output characteristics, lithium-transition metal composite oxide is preferably used as a positive electrode active material.

A composite oxide containing lithium and nickel is more preferably used, and $Li(Ni-Mn-Co)O_2$ and a composite oxide in which part of these transition metals is replaced with another element (hereinafter, simply referred to as "NMC composite oxide") is further preferably used. The NMC composite oxide has a layered crystal structure in which a lithium atom layer and a transition metal (Mn, Ni, and Co are arranged with regularity) atom layer are alternately stacked via an oxygen atom layer, one Li atom is included per atom of transition metal M. Therefore, extractable Li amount is twice the amount of spinel lithium manganese oxide, that is, as the supply power is two times higher, it can have high capacity.

As described above, the NMC composite oxide also includes a composite oxide in which a part of transition metal element is replaced with another metal element. In this case, examples of another metal element include Ti, Zr, Nb, W, P, Al, Mg, V, Ca, Sr, Cr, Fe, B, Ga, In, Si, Mo, Y, Sn, V, Cu, Ag, and Zn. Ti, Zr, Nb, W, P, Al, Mg, V, Ca, Sr, and Cr are preferable, Ti, Zr, P, Al, Mg, and Cr are more preferable, and from the viewpoint of improving the cycle characteristics, Ti, Zr, Al, Mg, and Cr are further preferable.

By having a high theoretical discharge capacity, the NMC composite oxide preferably has a composition represented by General Formula (1): $Li_aNi_bMn_cCo_dM_xO_2$ (with the proviso that, in the formula, a, b, c, d, and x satisfy $0.9 \leq a \leq 1.2$, $0 < b < 1$, $0 < c \leq 0.5$, $0 < d \leq 0.5$, $0 \leq x \leq 0.3$, $b+c+d=1$. M represents at least one element selected from Ti, Zr, Nb, W, P, Al, Mg, V, Ca, Sr, and Cr). Herein, a represents the atomic ratio of Li, b represents the atomic ratio of Ni, c represents the atomic ratio of Mn, d represents the atomic ratio of Co, and x represents the atomic ratio of M. From the viewpoint of the cycle characteristics, it is preferable that $0.4 \leq b \leq 0.6$ in General Formula (1). Incidentally, the composition of each element can be measured by induction coupled plasma (ICP) spectroscopy.

In general, from the viewpoint of improving purity and improving electron conductivity of a material, nickel (Ni), cobalt (Co), and manganese (Mn) are known to contribute to capacity and output characteristics. Ti or the like replaces a part of transition metal in a crystal lattice. From the viewpoint of cycle characteristics, a part of transition element is preferably replaced with another metal element, and particularly, it is preferable that $0 < x \leq 0.3$ in General Formula (1) be satisfied. The crystal structure is stabilized by solid-dissolving at least one material selected from the group consisting of Ti, Zr, Nb, W, P, Al, Mg, V, Ca, Sr, and Cr, and as a result, a decrease in capacity of the battery can prevented even when charging and discharging are repeated. Thus, it is considered that excellent cycle characteristics can be realized.

As a more preferred embodiment, from the viewpoint of improving a balance between capacity and lifetime characteristics, it is preferable that b, c, and d in General Formula (1) be $0.44 \leq b \leq 0.51$, $0.27 \leq c \leq 0.31$, and $0.19 \leq d \leq 0.26$. For example, as compared with $LiCoO_2$, $LiMn_2O_4$, $LiNi_{1/3}Mn_{1/3}Co_{1/3}O_2$, and the like that exhibit actual performance in a general consumer use battery, $LiNi_{0.5}Mn_{0.3}Co_{0.2}O_2$ has a large capacity per unit mass. Further, there is an advantage that a compact battery having a high capacity can be produced since the energy density can be improved. In addition, from the viewpoint of a cruising distance, $LiNi_{0.5}Mn_{0.3}Co_{0.2}O_2$ is preferable. Incidentally, in terms of having a larger capacity, $LiNi_{0.8}Co_{0.1}Al_{0.1}O_2$ is more advantageous. Additionally, $LiNi_{0.5}Mn_{0.3}Co_{0.2}O_2$ has lifetime characteristics as excellent as $LiNi_{1/3}Mn_{1/3}Co_{1/3}O_2$.

Incidentally, it is needless to say that a positive electrode active material other than the aforementioned positive electrode active material may be used.

Meanwhile, preferred examples of the negative electrode active material include a metal such as Si or Sn, a metal oxide such as $TiO$, $Ti_2O_3$, and $TiO_2$, $SiO_2$, $SiO$, and $SnO_2$, a composite oxide of lithium and transition metal such as $Li_{4/3}Ti_{5/3}O_4$ or $Li_7MnN$, a Li—Pb alloy, a Li—Al alloy, Li, and a carbon material such as graphite (natural graphite, artificial graphite), carbon black, activated carbon, carbon fiber, coke, soft carbon, or hard carbon. Further, the negative electrode active material preferably contains an element to be alloyed with lithium. By using the element to be alloyed with lithium, in comparison with a case where the carbon material is used, a battery having high energy density, high capacity, and excellent output characteristics can be obtained. These negative electrode active materials may be used alone or in combination of two or more kinds thereof. Preferably, from the viewpoint of capacity and output characteristics, a carbon material can be used as the negative electrode active material. Incidentally, it is needless to say that material other than the aforementioned negative electrode active material may be used.

When an active material other than the carbon material (hereinafter, referred to as "non-carbon-based active material") is used, a material with which the surface of the non-carbon-based active material is coated with a carbon material is preferably used as the active material. According to such an embodiment, the electron network is constructed between the active materials or between the active material and a conductive aid described below, and a conductive path in the electrode can be ensured even when an active material with large expansion or shrinkage is used. As a result, even when charging and discharging are repeated, an increase in resistance can be suppressed. More preferably, from the viewpoint of improving the energy density of the electrode, a material produced by coating a carbon material on a material capable of alloying with lithium of high capacity can be used as the active material. Regarding the amount of the carbon material coated in this case, an amount that enables the electrical contact between the active materials or between the active material and the conductive aid to be favorable may be used depending on the particle diameter of the non-carbon-based active material (particle). Preferably, the amount of the carbon material coated is adjusted to about 2 to 20% by mass relative to the total mass of the coated active material. Incidentally, the term "coating" in the present invention includes a form in which a carbon material is present in (attached to) apart of the surface of the active material as well as a form in which the entire surface of the active material is coated with a carbon material.

The average particle diameter of the active material is not particularly limited, but is preferably 1 to 100 µm and more preferably 1 to 20 µm from the viewpoint of higher capacity, reactivity, and cycle durability. When the average particle diameter is within such a range, the secondary battery can prevent an increase in internal resistance of the battery at the time of charging and discharging under high output conditions so as to extract a sufficient current. Incidentally, the active material includes secondary particles, the average particle diameter of primary particles constituting the secondary particles is desirably in a range of 10 nm to 1 µm, but the average particle diameter is not necessarily limited to this range in this embodiment. However, the active material is not required to be in the state of the secondary particles obtained by aggregation or clusterization, although it depends on the production method. Regarding the particle diameter of the active material and the particle diameter of the primary particles, a median diameter obtained by using a laser diffraction method can be used. Incidentally, the shape of the active material varies depending on the type or the production method, and examples thereof include a spherical shape (a powder shape), a plate-like shape, a needle-like shape, a column-like shape, and a rectangular shape. However, the shape is not limited to these and any shape can be used without any particular problem. Preferably, the best shape capable of properly improving battery characteristics such as charge and discharge characteristics is selected as appropriate.

The active material layer of this embodiment further contains other additives such as a conductive aid, a binder, an electrolyte (for example, a polymer matrix, an ion conductive polymer, or an electrolyte liquid), and a lithium salt for enhancing ion conductivity. However, the content of the material, which may function as the active material, in the active material layer is preferably 85 to 99.5% by mass.

The conductive aid means an additive which is blended in order to enhance the conductivity of the active material layer. Examples of the conductive aid include carbon materials such as carbon black including Ketjen black (registered trademark), acetylene black, and the like, and carbon fiber. When the active material layer contains a conductive aid, an electron network in the inside of the active material layer is effectively formed, and it can contribute to improvement of the output characteristics of a battery. Herein, the content of the conductive aid is not particularly limited as long as the conductivity of the active material layer can be improved up to a desired degree; however, the content thereof is preferably 0.5 to 15% by mass relative to the total amount of the active material layer (in terms of a solid content, provided that a carrier is excluded), and more preferably 1 to 10% by mass.

The binder has the function of binding the active material, conductive aid, and the like to each other and maintaining the configuration of the active material layer or the electron network. The material which may be used as the binder is not particularly limited, but when a binder is used in the active material layer including the negative electrode active material, an aqueous binder is preferably included. The aqueous binder has a high binding property, and has advantages of greatly suppressing an investment on facilities of a production line and lowering a burden on environment since water as a raw material is easily available and also only water vapor is generated during drying.

The aqueous binder indicates a binder which has water as a solvent or a dispersion medium, and specific examples thereof include a thermoplastic resin, a polymer with rubber elasticity, a water soluble polymer, and a mixture thereof. Herein, the binder which has water as a dispersion medium includes all expressed as latex or emulsion, and it indicates a polymer emulsified in water or suspended in water. Examples thereof include a polymer latex obtained by emulsion polymerization in a self-emulsifying system.

Specific examples of the aqueous binder include a styrene polymer (styrene-butadiene rubber, a styrene-vinyl acetate copolymer, a styrene-acryl copolymer, or the like), acrylonitrile-butadiene rubber, methyl methacrylate-butadiene rubber, a (meth)acrylic polymer (polyethylacrylate, polyethylmethacrylate, polypropylacrylate, polymethylmethacrylate (methyl methacrylate rubber), polypropylmethacrylate, polyisopropylacrylate, polyisopropylmethacrylate, polybutylacrylate, polybutylmethacrylate, polyhexylacrylate, polyhexylmethacrylate, polyethylhexylacrylate, polyethylhexylmethacrylate, polylaurylacrylate, polylaurylmethacrylate, or the like), polytetrafluoroethylene, polyethylene, polypropylene, an ethylene-propylene copolymer, polybutadiene, butyl rubber, fluororubber, polyethylene oxide, polyepichlorohydrin, polyphosphagen, polyacrylonitrile, polystyrene, an ethylene-propylene-diene copolymer, polyvinylpyridine, chlorosulfonated polyethylene, a polyester resin, a phenol resin, an epoxy resin; polyvinyl alcohol (the average polymerization degree is preferably 200 to 4000, and more preferably 1000 to 3000, and the saponification degree is preferably 80% by mol or more, and more preferably 90% by mol or more) and a modified product thereof (1 to 80% by mol saponified product in a vinyl acetate unit of a copolymer with ethylene/vinyl acetate=2/98 to 30/70 (molar ratio), 1 to 50% by mol partially acetalized product of polyvinyl alcohol, or the like), starch and a modified product thereof (oxidized starch, phosphoric acid esterified starch, cationized starch, or the like), cellulose derivatives (carboxymethyl cellulose, methyl cellulose, hydroxypropyl cellulose, hydroxyethyl cellulose, and salts thereof), polyvinylpyrrolidone, polyacrylic acid (salt), a copolymer of (meth)acrylamide and/or (meth)acrylic acid salt [a (meth)acrylamide polymer, a (meth)acrylamide-(meth)acrylic acid copolymer, an alkyl (carbon atom number of 1 to 4) (meth)acrylate-(meth)acrylic acid salt copolymer, or the like], a styrene-maleic acid salt copolymer, a mannich modified product of polyacrylamide, a formalin condensation type resin (a urea-formalin resin, a melamin-formalin resin, or the like), a polyamidepolyamine or dialkylamine-epichlorohydrin copolymer, polyethyleneimine, casein, soybean protein, synthetic protein, and a water soluble polymer such as galactomannan derivatives. These aqueous binders may be used alone or in combination of two or more kinds thereof.

From the viewpoint of a binding property, the aqueous binder preferably contains at least one rubber-based binder selected from the group consisting of styrene-butadiene rubber, acrylonitrile-butadiene rubber, methyl methacrylate-butadiene rubber, and methyl methacrylate rubber. Moreover, from the viewpoint of having a good binding property, the aqueous binder preferably contains styrene-butadiene rubber.

When styrene-butadiene rubber is used as an aqueous binder, the aforementioned water soluble polymer is preferably used in combination from the viewpoint of improving the coating property. Examples of the water soluble polymer which is preferably used in combination with styrene-butadiene rubber include polyvinyl alcohol and a modified product thereof, starch and a modified product thereof, cellulose derivatives (carboxymethyl cellulose, methyl cellulose, hydroxyethyl cellulose, and salts thereof), polyvinylpyrrolidone, polyacrylic acid (salt), and polyethylene glycol. Among them, styrene-butadiene rubber and carboxymethyl cellulose (salt) are preferably combined as a binder. The content mass ratio of the styrene-butadiene rubber to the water soluble polymer is not particularly limited, but the styrene-butadiene rubber: the water soluble polymer is preferably 1:0.1 to 10, and more preferably 1:0.5 to 2.

The content of the aqueous binder is preferably 80 to 100% by mass, more preferably 90 to 100% by mass, and further preferably 100% by mass relative to the total amount of the binder.

Further, a binder material other than the aqueous binder is not particularly limited, and examples thereof include a thermoplastic polymer such as polyethylene, polypropylene, polyethylene terephthalate (PET), polyether nitrile (PEN), polyacrylonitrile, polyimide, polyamide, polyamide imide, cellulose, carboxymethyl cellulose (CMC), an ethylene-vinyl acetate copolymer, polyvinyl chloride, styrene-butadiene rubber (SBR), isoprene rubber, butadiene rubber, ethylene-propylene rubber, an ethylene-propylene-diene copolymer, a styrene-butadiene-styrene block copolymer and a hydrogen additive thereof, or a styrene-isoprene-styrene block copolymer and a hydrogen additive thereof; a fluorine resin such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), or polyvinyl fluoride (PVF); a vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based fluorine rubber (VDF-PFMVE-TFE-basedfluorinerubber), or vinylidene fluoride-chlorotrifluoroethylene-based fluorine rubber (VDF-CTFE-based fluorine rubber); and an epoxy resin. Among these, polyvinylidene fluoride, polyimide, styrene-butadiene rubber, carboxymethyl cellulose, polypropylene, polytetrafluoroethylene, polyacrylonitrile, polyamide, and polyamide imide are more preferable. These preferred binders can be used in the active material layer since these binders are excellent in heat resistance, have a very wide potential window, and are stable with respect to both positive and negative potentials. These binders may be used alone or in combination of two or more kinds thereof.

The content of the binder is not particularly limited as long as it is sufficient to bind the active material, but is preferably 0.5 to 15% by mass and more preferably 1 to 10% by mass relative to the total amount (in terms of solid content, provided that a carrier is excluded) of the active material layer.

A material for forming the active material (an active material, a conductive aid, or the like) may be carried by a foamed metal carrier.

The foamed metal carrier is a carrier formed by a plate-like foamed metal. The term "foamed metal" indicates a cork-like metal having a large number of pores therein and is also referred to as a metal foam. Further, for the foamed metal carrier, commercially available products can be used and the foamed metal carrier can also be obtained by subjecting a foamed resin of polyurethane, polypropylene, polyethylene, or the like to metal plating and decomposing or removing the resin through calcination of the metal plated product. At this time, as the foamed resin, foamed urethane is preferably used in terms of high porosity and ease of thermal decomposition.

The material for forming the foamed metal carrier is not particularly limited, and a metal material which is conventionally used as the constituent material of the current collector can be used similarly. As an example of the constituent material of foamed metal carrier, aluminum, nickel, copper, stainless steel, or the like is mentioned.

The foaming property, that is, the porosity of the foamed metal carrier is not particularly limited, but can be appropriately determined in consideration of a supported amount of an active material or the like necessary for obtaining a desired battery capacity or desired electrode performance. However, as the porosity of the foamed metal carrier is increased, the proportion of the volume of the carrier in the electrode volume is reduced, and thus the volume for carrying the active material or lithium ion diffusion path can be sufficiently ensured. From such a viewpoint, the porosity of the foamed metal carrier is preferably 90% or more. However, the porosity of the foamed metal carrier is not limited only to the embodiment included in these ranges, and embodiments out of these ranges can be employed. Incidentally, the upper limit value of the porosity of the foamed metal carrier is not particularly limited, but in consideration of ease of production or strength, the upper limit value is 98% or less. Herein, as the value of "the porosity of the foamed metal carrier" in this application, a value obtained from a ratio of the true volume calculated from the true density of the material to the apparent volume is employed.

Incidentally, the shape of the void part of the foamed metal carrier is not particularly limited, and any shape may be employed.

The thickness of the foamed metal carrier is also not particularly limited, and may be appropriately determined in consideration of a supported amount or the like of an active material or the like necessary for obtaining a desired battery capacity.

The thickness of the active material layer of this embodiment (the thickness of the foamed metal carrier) is not particularly limited, and although conventionally known finding on the battery can be referred to, the thickness thereof is preferably 0.1 to 3 mm and more preferably 0.5 to 1.5 mm. When the thickness of the active material layer is 0.1 mm or more, the battery capacity can be sufficiently ensured. On the other hand, when the thickness of the active material layer is about 3 mm or less, the occurrence of a problem of an increase in internal resistance caused when lithium ions become difficult to disperse into a depth portion (or toward the current collector side) of the electrode can be suppressed.

[Electrolyte Layer]

The electrolyte to be used in the electrolyte layer of this embodiment is not particularly limited, and a liquid electrolyte, a gel polymer electrolyte, or an ionic liquid electrolyte can be used from the viewpoint of ensuring the ion conductivity of the aforementioned active material layer for non-aqueous electrolyte secondary battery.

The liquid electrolyte has a function as a lithium ion carrier. The liquid electrolyte constituting an electrolyte layer has the form in which a lithium salt as a supporting salt is dissolved in an organic solvent as a plasticizer. Examples of the organic solvent which can be used include carbonates such as ethylene carbonate (EC), propylene carbonate (PC), dimethyl carbonate (DMC), diethyl carbonate (DEC), and ethylmethyl carbonate. Further, as a lithium salt, a compound which can be added to an active material layer of an electrode such as $Li(CF_3SO_2)_2N$, $Li(C_2F_5SO_2)_2N$, $LiPF_6$, $LiBF_4$, $LiClO_4$, $LiAsF_6$, $LiTaF_6$, or $LiCF_3SO_3$ can be similarly employed. The liquid electrolyte may further contain an additive in addition to the components described above. Specific examples of such a compound include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinyl ethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methylene ethylene carbonate, and 1,1-dimethyl-2-methylene ethylene carbonate. Among them, vinylene carbonate, methylvinylene carbonate, and vinylethylene carbonate are preferable, and vinylene carbonate and vinylethylene carbonate are more preferable. These cyclic carbonate esters may be used alone or in combination of two or more kinds thereof.

The gel polymer electrolyte has a configuration in which the aforementioned liquid electrolyte is injected to a matrix polymer (host polymer) formed by an ion conductive polymer. Using the gel polymer electrolyte as an electrolyte is excellent in that the fluidity of an electrolyte disappears and ion conductivity between layers is easily blocked. Examples of an ion conductive polymer which is used as a matrix polymer (host polymer) include polyethylene oxide (PEO), polypropylene oxide (PPO), polyethylene glycol (PEG), polyacrylonitrile (PAN), polyvinylidene fluoride-hexafluoropropylene (PVdF-HEP), polymethyl methacrylate (PMMA), and copolymers thereof.

The matrix polymer of a gel polymer electrolyte can exhibit excellent mechanical strength by forming a cross-linked structure. For forming a cross-linked structure, it is sufficient to perform a polymerization treatment of a polymerizable polymer for forming a polymer electrolyte (for example, PEO and PPO), such as thermal polymerization, UV polymerization, radiation polymerization, and electron beam polymerization, by using a suitable polymerization initiator.

The ionic liquid electrolyte is obtained by dissolving a lithium salt in an ionic liquid. Incidentally, the ionic liquid is a salt composed of cation and anion alone, and represents a series of compounds which is liquid at normal temperature.

Regarding the cationic component constituting an ionic liquid, it is preferable to use at least one selected from the group consisting of a substituted or unsubstituted imidazolium ion, a substituted or unsubstituted pyridinium ion, a substituted or unsubstituted pyrrolium ion, a substituted or unsubstituted pyrazolium ion, a substituted or unsubstituted pyrrolinium ion, a substituted or unsubstituted pyrrolidinium ion, a substituted or unsubstituted piperidinium ion, a substituted or unsubstituted triazinium ion, and a substituted or unsubstituted ammonium ion.

Specific examples of the anionic component constituting an ionic liquid include halide ion such as fluoride ion, chloride ion, bromide ion, or iodide ion, nitric acid ion ($NO_3^-$), tetrafluoroborate ion ($BF_4^-$), hexafluorophosphate ion ($PF_6^-$), $(FSO_2)_2N^-$, $AlCl_3^-$, lactic acid ion, acetate ion ($CH_3COO^-$), trifluoroacetate ion ($CF_3COO^-$), methanesulfonate ion ($CH_3SO_3^-$), trifluoromethanesulfonate ion ($CF_3SO_3^-$), bis(trifluoromethanesulfonyl)imide ion ($(CF_3SO_2)_2N^-$), bis(pentafluoroethylsulfonyl)imide ion ($(C_2F_5SO_2)_2N^-$), $BF_3C_2F_5^-$, tris(trifluoromethanesulfonyl) carbon acid ion ($(CF_3SO_2)_3C^-$), perchlorate ion ($ClO_4^-$), dicyanamide ion ($(CN)_2N^-$), organic sulfuric acid ion, organic sulfonic acid ion, $R^1COO^-$, $HOOCR^1COO^-$, $^-OOCR^1COO^-$, and $NH_2CHR^1COO^-$ (in this case, $R^1$ is a substituent and represents an aliphatic hydrocarbon group, an alicyclic hydrocarbon group, an aromatic hydrocarbon group, an ether group, an ester group, or an acyl group, and the substituent may include a fluorine atom).

Preferred examples of the ionic liquid include 1-methyl-3-methylimidazolium bis(trifluoromethanesulfonyl)imide, and N-methyl-N-propylpyrrolidinium bis(trifluoromethanesulfonyl)imide. These ionic liquids may be used alone or in combination of two or more kinds thereof.

The lithium salt which is used in the ionic liquid electrolyte is the same lithium salt which is used in the liquid electrolyte described above. Incidentally, the concentration of the lithium salt is preferably 0.1 to 2.0 M, and more preferably 0.8 to 1.2 M.

An additive as described below may be added to the ionic liquid. When an additive is contained, charge/discharge characteristics and cycle characteristics may be further improved at a high rate. As an additive, the same additive as the additive included in the above mentioned liquid electrolyte can be used. Specific examples of the additive include vinylene carbonate, ethylene carbonate, propylene carbonate, γ-butylolactone, γ-valerolactone, methyl diglyme, sulfolane, trimethylphosphate, triethylphosphate, methoxymethyl ethyl carbonate, and fluorinated ethylene carbonate.

These may be used alone or in combination of two or more kinds thereof. The use amount when an additive is used is preferably 0.5 to 10% by mass, and more preferably 0.5 to 5% by mass relative to the ionic liquid.

Further, a separator may be used in an electrolyte layer. The separator has a function of holding an electrolyte so as to secure the lithium ion conductivity between a positive electrode and a negative electrode and a function of serving as a partition wall between a positive electrode and a negative electrode. In particular, in a case where a liquid electrolyte or an ionic liquid electrolyte is used as an electrolyte, it is preferable to use a separator.

Examples of a separator shape include a porous sheet separator or a non-woven separator composed of a polymer or a fiber which absorbs and maintains the electrolyte.

As a porous sheet separator composed of a polymer or a fiber, a microporous (microporous membrane) separator can be used, for example. Specific examples of the porous sheet composed of a polymer or a fiber include a microporous (microporous membrane) separator which is composed of polyolefin such as polyethylene (PE) and polypropylene (PP); a laminate in which a plurality of them are laminated (for example, a laminate with three-layer structure of PP/PE/PP), and a hydrocarbon based resin such as polyimide, aramid, or polyfluorovinylydene-hexafluoropropylene (PVdF-HFP), or glass fiber.

The thickness of the microporous (microporous membrane) separator cannot be uniformly defined as it varies depending on use of application. For example, for an application in a secondary battery for operating a motor of an electric vehicle (EV), a hybrid electric vehicle (HEV), and a fuel cell vehicle (FCV), it is preferably 4 to 60 µm as a single layer or a multilayer. The fine pore diameter of the microporous (microporous membrane) separator is preferably 1 µm or less at most (in general, the pore diameter is about several tens of nanometers).

As a non-woven separator, conventionally known ones such as cotton, rayon, acetate, nylon, and polyester; polyolefin such as PP and PE; polyimide and aramid are used either singly or as a mixture. Further, the bulk density of the non-woven separator is not particularly limited as long as sufficient battery characteristics are obtained with an impregnated polymer gel electrolyte. Furthermore, it is sufficient that the thickness of the non-woven separator is the same as that of an electrolyte layer, and the thickness thereof is preferably 5 to 200 µm, and particularly preferably 10 to 100 µm.

Further, as a separator, a separator in which a heat resistant insulating layer is laminated on a porous substrate (a separator having a heat resistant insulating layer) is preferable. The heat resistant insulating layer is a ceramic layer containing inorganic particles and a binder. As for the separator having a heat resistant insulating layer, those having high heat resistance, that is, a melting point or a heat softening point of 150° C. or higher, preferably 200° C. or higher, are used. By having a heat resistant insulating layer, internal stress in a separator, which increases under temperature increase, is alleviated so that the effect of inhibiting thermal shrinkage can be obtained. As a result, an occurrence of a short between electrodes of a battery can be prevented so that a battery configuration not easily allowing a performance reduction as caused by temperature increase is yielded. Furthermore, by having a heat resistant insulating layer, mechanical strength of a separator having a heat resistant insulating layer is improved so that the separator hardly has a film breaking. Moreover, because of the effect of inhibiting thermal shrinkage and a high level of mechanical strength, the separator is hardly curled during the process of producing a battery.

The inorganic particles in a heat resistant insulating layer contribute to the mechanical strength or the effect of inhibiting thermal shrinkage of the heat resistant insulating layer. The material used as inorganic particles is not particularly limited. Examples thereof include oxides ($SiO_2$, $Al_2O_3$, $ZrO_2$, $TiO_2$), hydroxides, and nitrides of silicon, aluminum, zirconium, and titanium, and a composite thereof. These inorganic particles may be derived from mineral resources such as boehmite, zeolite, apatite, kaolin, mullite, spinel, olivine, and mica, or artificially synthesized. Furthermore, these inorganic particles may be used alone or in combination of two or more kinds thereof. Among them, from the viewpoint of the cost, it is preferable to use silica ($SiO_2$) or alumina ($Al_2O_3$), and it is more preferable to use alumina ($Al_2O_3$).

The weight per unit area of heat resistant particles is not particularly limited, but is preferably 5 to 15 $g/m^2$. When the weight per unit area is within this range, sufficient ion conductivity is obtained and heat resistant strength is maintained, which is preferable.

The binder in a heat resistant insulating layer has a role of attaching inorganic particles to each other or attaching inorganic particles to a porous resin substrate layer. With this binder, the heat resistant insulating layer is stably formed and peeling between a porous substrate layer and a heat resistant insulating layer is prevented.

The binder used for a heat resistant insulating layer is not particularly limited, and examples thereof which can be used as the binder include compounds such as carboxymethyl cellulose (CMC), polyacrylonitrile, cellulose, an ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), and methyl acrylate. Among these, carboxymethyl cellulose (CMC), methyl acrylate, or polyvinylidene fluoride (PVDF) is preferably used. These compounds may be used alone or in combination of two or more kinds thereof.

The content of the binder in the heat resistant insulating layer is preferably 2 to 20% by mass relative to 100% by mass of the heat resistant insulating layer. When the content of the binder is 2% by mass or more, the peeling strength between the heat resistant insulating layer and a porous substrate layer can be increased and vibration resistance of a separator can be enhanced. On the other hand, when the content of the binder is 20% by mass or less, a gap between inorganic particles is maintained at an appropriate level so that sufficient lithium ion conductivity can be ensured.

The thermal shrinkage rates of a separator having a heat resistant insulating layer for both MD and TD are 10% or less after maintaining for 1 hour at conditions of 150° C. and 2 $gf/cm^2$. By using a material with such high heat resistance, shrinkage of a separator can be effectively prevented even when the internal temperature of a battery reaches 150° C. due to increased heat generation amount from a positive electrode. As a result, an occurrence of a short between electrodes of a battery can be prevented, and thus a battery configuration not easily allowing performance reduction due to temperature increase is yielded.

[Positive Electrode Current Collecting Plate and Negative Electrode Current Collecting Plate]

The material for forming a current collecting plate (30, 40) is not particularly limited, and a known highly conductive material which has been conventionally used for a current collecting plate of a lithium ion secondary battery can be used. Preferred examples of the material for forming a current collecting plate include metal materials such as aluminum, copper, titanium, nickel, stainless steel (SUS), and an alloy thereof. From the viewpoint of light weightiness, resistance to corrosion, and high conductivity, aluminum and copper are more preferable. Incidentally, the same material or a different material may be used for the positive electrode current collecting plate 30 and negative electrode current collecting plate 40.

Further, the current collecting plate and the outermost layer current collector may be pasted by the conductive adhesive member as necessary. By using the conductive adhesive member, the in-plane variation of the electrical contact between the current collecting plate and the outermost layer current collector can be reduced.

[Positive Electrode Lead and Negative Electrode Lead]

Further, although it is not illustrated, the current collector 7 and the current collecting plate (30, 40) may be electrically connected to each other via a positive electrode lead or a negative electrode lead. The same material used for a lithium ion secondary battery of a related art can be also used as a material for forming the positive and negative electrode leads. Incidentally, a portion led from an outer casing is preferably coated with a heat resistant and insulating thermally shrunken tube or the like so that it has no influence on a product (for example, an automobile component, in particular, an electronic device or the like) according to electric leak after contact with peripheral devices or wirings.

[Sealing Portion]

The sealing portion (insulation layer) has a function of preventing contact between the current collectors adjacent to each other and preventing a short circuit caused at the end portion of the single battery layer. The material constituting the sealing portion may be any materials as long as it has an insulation property, a sealing property (sealing performance) to prevent the solid electrolyte from coming off and prevent permeation of external moisture, heat resistance under battery operation temperature and the like. Examples of the material include an acrylic resin, a urethane resin, an epoxy resin, a polyethylene resin, a polypropylene resin, a polyimide resin, and rubber (ethylene-propylene-diene rubber: EPDM). Alternatively, an isocyanate adhesive, an acrylic resin adhesive, a cyanoacrylate adhesive, or the like may be used, and a hot-melt adhesive (urethane resin, polyamide resin, polyolefin resin) may also be used. Among these, from the viewpoint of corrosion resistance, chemical resistance, ease of production (film-forming performance), economical efficiency, and the like, a polyethylene resin or a polypropylene resin is preferably used as a constituent material of the insulation layer, and a resin containing an amorphous polypropylene resin as a main component and obtained by copolymerizing ethylene, propylene, and butene is preferably used.

[Outer Casing Body]

As a battery outer casing body (battery outer casing body), an envelope-shaped casing capable of covering a power generating element, in which a laminate film including aluminum is contained, may be used in addition to a known metal can casing. As for the laminate film, a laminate film with a three-layered structure formed by laminating PP, aluminum, and nylon in this order can be used, but is not limited thereto. From the viewpoint of having higher output power and excellent cooling performance, and of being suitably usable for a battery for a large instrument such as an EV or an HEV, a laminate film is desirable. In addition, since the group pressure applied from outside to a power generating element can be easily controlled and thus the thickness of an electrolyte layer can be easily controlled to a desired value, a laminate film including aluminum is more preferred for an outer casing body.

[Cell Size]

Figure 8:
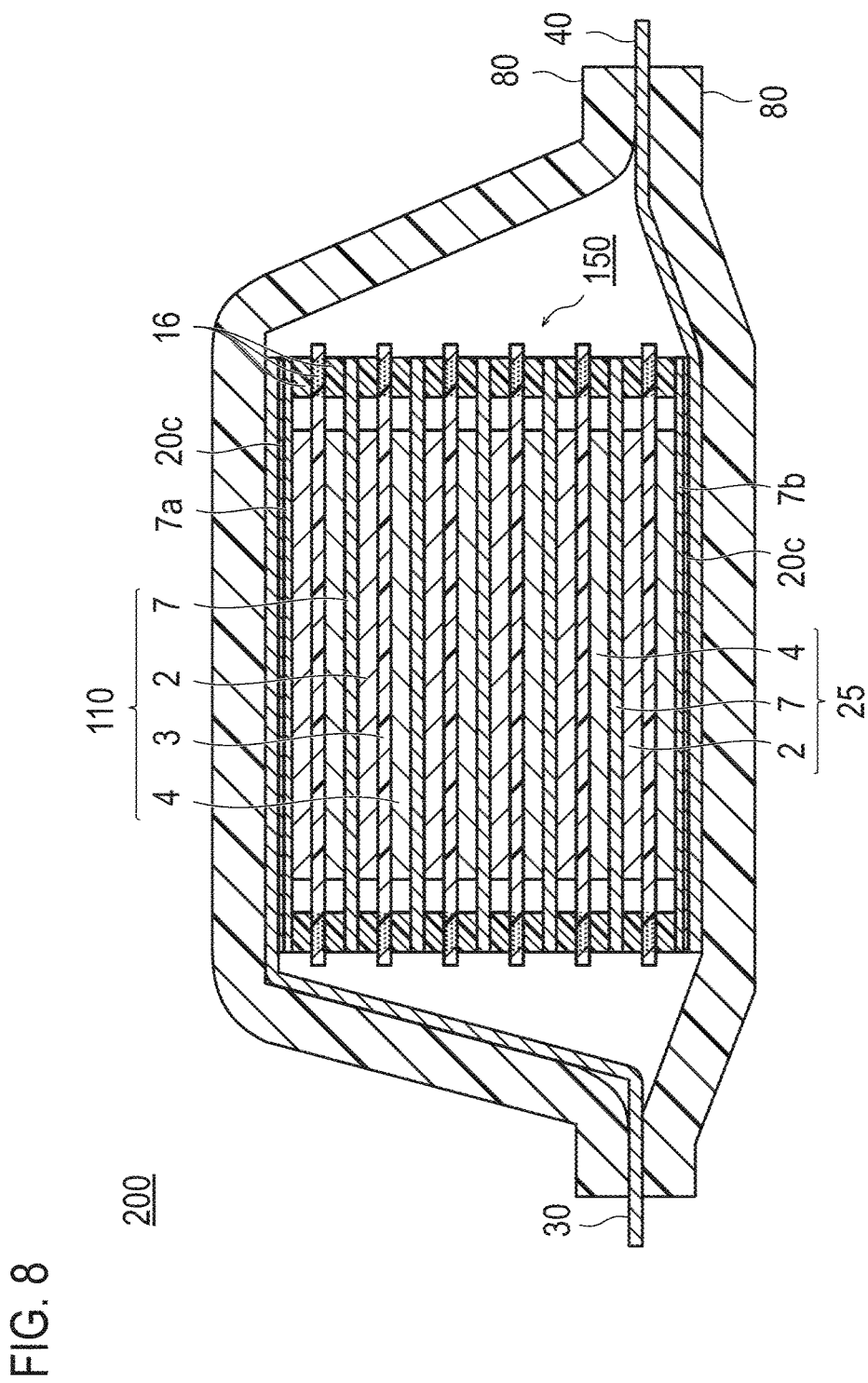
FIG. 8 is a schematic cross-sectional view schematically illustrating a laminate (flat) bipolar type lithium ion secondary battery according to a second embodiment of the present invention.
Figure 9:
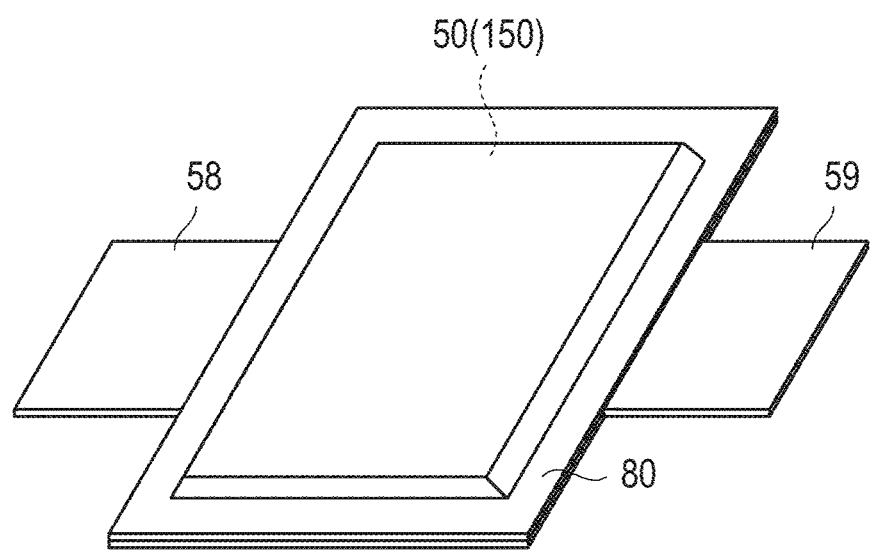
FIG. 9 is a perspective view illustrating the outer appearance of the lithium ion secondary battery illustrated in FIG. 1 and FIG. 8.

FIG. 9 is a perspective view illustrating the appearance of a lithium ion secondary battery illustrated in FIG. 1 and FIG. 8 described below.

As illustrated in FIG. 9, a flat secondary battery 100 (or 200) has a flat and rectangular shape, and from both sides, a positive electrode tab 58 and a negative electrode tab 59 are drawn to extract electric power. A power generating element 50 is covered by a battery outer casing material (laminate film 80) of the secondary battery 100 (or 200) with its periphery fused by heat. The power generating element 50 (or 150) is sealed in a state in which the positive electrode tab 58 and the negative electrode tab 59 are led to the outside. Herein, the power generating element 50 (or 150) corresponds to the power generating element 50 (or 150) of the bipolar type secondary battery 100 (or 200) illustrated in FIG. 1 described above and FIG. 8 as described below.

Incidentally, the laminate type secondary battery according to the present invention is not limited to a flat shape of laminate type. The winding bipolar type secondary battery may have a barrel shape or a flat and rectangular shape obtained by modifying the barrel shape, and there is no particular limitation. As an outer casing material of the barrel shape, a laminate film may be used, or a barrel can (metal can) of a related art may be used, and thus there is no particular limitation. Preferably, the power generating element is encased with an aluminum laminate film. The weight reduction may be achieved with such shape. In addition, in a winding type lithium ion battery, it is also possible to form a terminal by using, for example, a barrel can (metal can) instead of a tab.

Further, the drawing out of the tabs 58 and 59 illustrated in FIG. 9 is not particularly limited, either. The positive electrode tab 58 and the negative electrode tab 59 may be drawn out from the same side or each of the positive electrode tab 58 and the negative electrode tab 59 may be divided into plural pieces and may be drawn out from the respective sides. The drawing out of the tabs 58 and 59 is not limited to that illustrated in FIG. 9.

<<Method for Producing Laminate Type Battery>>

The method for producing a laminate type battery (hereinafter, simply also referred to as the "production method") is not particularly limited as long as a plurality of single battery layers each having the configuration described above can be laminated to be electrically connected in series via the resistance reduction layer abutted to the resin current collector. Therefore, the method for producing a laminate type battery of this embodiment includes the following steps. First, a plurality of single battery layers, in which the single battery layer is formed by sequentially laminating a positive electrode current collector, a positive electrode active material layer, an electrolyte layer, a negative electrode active material layer, and a negative electrode current collector, are laminated to be electrically connected in series to prepare a power generating element. Next, the power generating element is sealed inside an outer casing body. Then, at this time, the step of preparing a power generating element includes laminating the single battery layer having the current collector including the conductive resin layer and the adjacent single battery layer via a resistance reduction layer. Incidentally, at least one of the positive electrode current collector and the negative electrode current collector includes a resin layer having conductivity.

In such a production method, the single battery layers are prepared in advance, and battery characteristics of each of the single battery layers can be evaluated. Therefore, the single battery layer having a defect can be excluded before the laminate type battery is assembled. Further, when the single battery layers each including the resin current collector are not simply laminated but are laminated via the resistance reduction layer abutted to the resin current collector, an increase in contact resistance caused by including the resin current collector can be suppressed.

The production method according to this embodiment can be performed by the procedures as described below, for example. First, a plurality of single battery layers are prepared in advance, and resistance reduction layers are formed on the surfaces of the positive electrode current collector and/or the negative electrode current collector included in these single battery layers. Then, the plurality of single battery layers each provided with the resistance reduction layer are laminated to be electrically connected in series to thereby form a power generating element, and the power generating element is sealed in the outer casing body.

In addition to the above-described procedures, the production method according to this embodiment may be performed by procedures as described below. First, when the single battery layer is prepared, a resistance reduction layer is formed in advance on the surface of the positive electrode current collector and/or the negative electrode current collector (the surface opposite to the surface on which the active material layer is laminated). Then, the single battery layer is prepared so that the resistance reduction layer is disposed outside when the active material layer and the electrolyte layer are laminated. In this configuration, the resistance reduction layer, the positive electrode current collector, the positive electrode active material layer, the electrolyte layer, the negative electrode active material layer, the negative electrode current collector layer, and the resistance reduction layer are laminated in this order. Incidentally, it is sufficient that one resistance reduction layer is provided for each single battery layer, and it is not necessary that the resistance reduction layers are necessarily provided on both of the positive electrode current collector and the negative electrode current collector as described above. Next, the plurality of single battery layers each provided with the resistance reduction layer are laminated to be electrically connected in series to thereby form a power generating element, and the power generating element is sealed in the outer casing body.

Of two kinds of the procedures described above, in consideration of variety, work efficiency, or the like of the method for forming the resistance reduction layer, the latter is preferable. Further, as compared to a case where the step of forming the resistance reduction layer is performed after the single battery layer is assembled, a case where the current collector, which is provided with the resistance reduction layer in advance, is laminated on the active material layer or the like is also preferable from the viewpoint that the characteristics of the single battery layer are difficult to deteriorate.

Therefore, regarding the production method according to this embodiment, hereinafter, procedures in which the resistance reduction layer is formed in advance on the current collector, and then the single battery layer is prepared and the single battery layer provided with the resistance reduction layer is laminated will be described.

The method for forming a resistance reduction layer is not particularly limited, but for example, there are mentioned (1) a method for forming a resistance reduction layer by a dry or wet film forming method, (2) a method of transferring a resistance reduction layer onto a current collector, (3) a method of pasting a resistance reduction layer and a current collector by a conductive adhesive member, (4) a method of applying a coating liquid containing a conductive material onto a current collector to form a resistance reduction layer, and the like. The details of these respective methods will be specifically described below.

[(1) Method for Forming Resistance Reduction Layer on Current Collector by Dry or Wet Film Forming Method]

In this method, a resistance reduction layer is formed directly on a current collector by using a dry film forming method such as a sputtering method, a vapor deposition method, or an ion plating method or a wet film forming method such as a plating method.

The sputtering method is not particularly limited, and examples thereof include a dipole DC glow discharge sputtering method, a magnetron sputtering method, and an ion-beam sputtering method.

The vapor deposition method is not particularly limited, and examples thereof include a resistance heating method, an electron beam method, a high frequency induction method, and a laser method.

The ion plating method is not particularly limited, and examples thereof include an RF ion plating method, a resistance heating ion plating method, and an electron beam ion plating method.

The plating method is not particularly limited, and examples thereof include an electroless plating method and a method of performing electrolytic plating after electroless plating.

Among these methods, in terms that the conductive filler contained in the conductive resin layer and the resistance reduction layer are more easily in contact with each other and the contact resistance is further reduced, a sputtering method or a vapor deposition method is preferably used.

The formation condition of the resistance reduction layer in the above-described method is not particularly limited as long as it is the condition that enables the resistance reduction layer as described above to be formed on the current collector. A known condition is used or a condition may be appropriately selected depending on the type of the material to be used for the resistance reduction layer.

This method is useful in a case where the resistance reduction layer does not contain a resin or the like, that is, in a case where a resistance reduction layer is formed by only a metal as a conductive material.

[(2) Method of Transferring Resistance Reduction Layer onto Current Collector]

In this method, a resistance reduction layer which is separately prepared from a current collector is transferred onto a current collector.

As a method for separately preparing a resistance reduction layer from a current collector, for example, there is mentioned a method in which an ink containing a conductive material is applied onto a heat-resistance film such as a polyimide film and is dried to obtain a resistance reduction layer. Further, when the resistance reduction layer contains a conductive material and a polymer material, this method is preferably used, and in this method, the resistance reduction layer can be obtained by melting and mixing the conductive material and the polymer material and subjecting the melted-and-kneaded material to rolling by a heat pressing device.

As a solvent used in the ink, for example, ketones such as acetone, aromatic hydrocarbon solvents such as toluene and xylene, polar solvents such as N-methyl-2-pyrrolidone (NMP), dimethylformamide (DMF), dimethylacetamide (DMAc), dimethylsulfoxide (DMSO), tetrahydrofuran (THF), and acetonitrile, and the like can be used. These may be used alone or may be used as a mixture of two or more kinds thereof.

The concentration of the conductive material in the ink is not particularly limited. The coating method is also not particularly limited, but examples thereof include coating with a brush, a bar coating method, a spray coating method, a screen printing method, and an inkjet method. Although the appropriate applied amount of the conductive material varies depending on the type of the conductive material and cannot be specified unconditionally, it is preferable to adjust the applied amount to an amount that achieves a small contact resistance with the active material layer and that although slightly overlapping the active material layer, achieves not too much thick thickness of the conductive material with respect to the thickness of the active material layer. The drying temperature and the drying time are not particularly limited, and may be appropriately determined depending on a solvent to be used in a range that deterioration of the material does not occur.

As a method of transferring the obtained resistance reduction layer (also including a resistance reduction layer obtained by melting/mixing and rolling) onto the current collector, there is mentioned a method such as heat pressing using a known heat roll apparatus, heat pressing apparatus, or the like. Incidentally, the resistance reduction layer can be formed on the current collector without performing heat pressing, but heat pressing is preferably performed from the viewpoint that the electrical contact between the conductive filler and the resistance reduction layer is more efficiently performed so that the contact resistance is further reduced.

As an example of heat pressing conditions, when the polymer material included in the resin current collector is polypropylene, heat pressing is preferably performed at a temperature range of 170 to 200° C. under the pressing condition that the conductive resin layer does not become thin. In particular, heat pressing is preferably performed at a temperature slightly higher than a melting point of the polymer material included in the resin current collector. With such a temperature range, at least a part of the polymer material is melted and the conductive filler in the conductive resin layer and the resistance reduction layer are easily in electrical contact with each other, which is preferable. Further, by performing heat pressing, a structure in which at least a part of the resistance reduction layer gets into the surface of the conductive resin layer can be formed. With such a structure, the conductive filler in the current collector and the resistance reduction layer are more easily in contact with each other, and thus the contact resistance is further reduced so that the output performance of the battery can be improved.

When the resistance reduction layer is prepared on the heat-resistance film, the resistance reduction layer can be formed on the current collector by removing the heat-resistance film after transfer.

[(3) Method of Pasting Resistance Reduction Layer Main Body and Current Collector by Conductive Adhesive Member]

In this method, a resistance reduction layer main body, which is separately prepared from a current collector including a conductive resin layer, is pasted onto a current collector by using a conductive adhesive member. The method for separately producing a resistance reduction layer main body from a current collector is the same as the contents described in the above-described section and thus the description thereof is omitted herein. In this way, a conductive resin layer may be formed by the resistance reduction layer main body and the conductive adhesive member.

The conductive adhesive member contains a monomer or oligomer having two or more thermally polymerizable groups in one molecule, a conductive material, a polymerization initiator, or the like.

Examples of the monomer or oligomer include bifunctional (meth)acrylate such as ethylene glycol di(meth)acrylate, diethylene glycol di(meth)acrylate, triethylene glycol di(meth)acrylate, tetraethylene glycol di(meth)acrylate, propylene glycol di(meth)acrylate, dipropylene glycol di(meth)acrylate, tripropylene glycol di(meth)acrylate, 1,3-butanediol di(meth)acrylate, 1,4-butanediol di(meth)acrylate, or 1,6-hexanediol di(meth)acrylate; trifunctional (meth)acrylate such as trimethylolpropane tri(meth)acrylate or pentaerythritol tri(meth)acrylate; and tetrafunctional (meth)acrylate such as ditrimethylolpropane tetra(meth)acrylate, or pentaerythritol tetra(meth)acrylate. In addition to the above-described examples, monomers such as urethane (meth)acrylate, a copolymerization oligomer thereof, and a copolymerization oligomer with acrylonitrile are exemplified, but the monomer or oligomer is not limited thereto. Further, the conductive adhesive member can include examples mentioned as a pressure sensitive adhesive/adhesive described in the above-described section "Resistance Reduction Layer."

Further, examples of the conductive material include carbon materials such as acetylene black, Ketjen black (registered trademark), carbon black, graphite, vapor-phase grown carbon fibers, and carbon nanotube; and powder of metals such as gold, silver, copper, aluminum, nickel, and magnesium. Examples of the polymerization initiator include dicumyl peroxide, di-t-butyl peroxide, t-butyl peroxybenzoate, t-butyl hydroperoxide, benzoyl peroxide, cumene hydroperoxide, and t-butyl peroxypivalate.

The monomer or oligomer, the conductive material, and the polymerization initiator respectively may be used alone or may be used as a mixture of two or more kinds thereof.

In the case of such a production method, the in-plane variation of the contact resistance is reduced.

[(4) Method of Applying Coating Liquid Containing Conductive Material to Form Resistance Reduction Layer]

In this method, a coating liquid containing a conductive material is applied onto a current collector to form a resistance reduction layer.

Herein, the type or the like of the conductive material included in the resistance reduction layer is the same as the contents described in the above-described section "Resistance Reduction Layer" and thus the description thereof is omitted.

A solvent used in the coating liquid containing a conductive material is not particularly limited, but the same solvent as the solvent for the ink in the above method (2) is preferably used. Further, as described later, components other than the conductive material are further contained, and in a case where the conductive material can be dispersed in the other components, the solvent may not be added.

The concentration of the conductive material in the coating liquid is not particularly limited, but is preferably 2 to 50% by mass. The coating method is not particularly limited, but examples thereof include coating with a brush, a bar coating method, a spray coating method, a screen printing method, and an inkjet method.

From the viewpoint of adhesiveness between the resistance reduction layer and the current collector, it is preferable that the coating liquid further contain other components such as an adhesive (raw material) or a pressure sensitive adhesive (raw material), and a polymerization initiator in addition to the conductive material.

The adhesive (raw material) and the pressure sensitive adhesive (raw material) are not particularly limited, but a known adhesive (raw material)/pressure sensitive adhesive (raw material) can be used. Examples of the adhesive/pressure sensitive adhesive which may be included in the resistance reduction layer are the same as the contents described in the above-described section "Resistance Reduction Layer" and thus the description thereof is omitted herein.

The adhesive raw material and the pressure sensitive adhesive raw material included in the coating liquid for forming the resistance reduction layer are also not particularly limited, and in addition to a compound (monomer or oligomer) that is a raw material of the adhesive/pressure sensitive adhesive, a compound exemplified as the raw material of the conductive adhesive member in the above method (3) can be used. The compound is preferably a monomer having a thermally polymerizable group.

Further, when the coating liquid contains the compound that is a raw material of the adhesive/pressure sensitive adhesive, it is preferable that a polymerization initiator be further contained. As the polymerization initiator, a compound exemplified as the polymerization initiator in the above method (3) can be used.

The monomer or oligomer, the conductive material, and the polymerization initiator respectively may be used alone or may be used as a mixture of two or more kinds thereof.

The concentration of the compound that is a raw material of the adhesive/pressure sensitive adhesive in the coating liquid is not particularly limited, but is preferably 50 to 95% by mass. Further, the concentration of the polymerization initiator in the coating liquid is preferably 0.1 to 10% by mass and more preferably 1 to 10% by mass.

After the coating liquid is applied to at least one surface of the current collector, for example, the coating liquid is held at a temperature range of 30 to 110° C. for 0.1 to 3 hours, more preferably for 0.5 to 3 hours, and thus the resistance reduction layer can be formed on the current collector. The whole current collector may be pressed at the time of drying or after drying, as necessary. Further, when the coating liquid contains the compound that is a raw material of the adhesive/pressure sensitive adhesive, it is preferable that the raw material compound be polymerized by appropriately adjusting the temperature at the time of drying.

After the resistance reduction layer is prepared by the above-described procedures, further, the resistance reduction layer may be held at a constant temperature in order to improve compatibility between the current collector and the resistance reduction layer. For example, it is preferable that the current collector having the resistance reduction layer formed thereon be held at a temperature range of 30 to 70° C. for 0.5 to 3 hours. By performing such an operation, the effect of further improving the output performance is expected.

As described above, after the resistance reduction layer is formed on the current collector, an active material layer is laminated on the surface opposite to the surface on which the resistance reduction layer is formed in the current collector. Then, a single battery layer is prepared by using the current collector provided with the resistance reduction layer and the single battery layer is laminated to thereby prepare a power generating element. Further, the power generating element is sealed in an outer casing body. Herein, in the step subsequent to the step of laminating the active material layer on the current collector provided with the resistance reduction layer, the method thereof is not particularly limited, but the same method as a known method can be employed or a method with appropriate modification can be employed.

As the method for forming a resistance reduction layer, among the above-described methods (1) to (4), the method (1), (2), or (4) is preferable. That is, a method for producing a laminate type battery according to an embodiment preferably includes a step of forming a resistance reduction layer on a current collector by a dry or wet film forming method (a resistance reduction layer forming step 1). Thereafter, it is preferable to include a step of forming a single battery layer including the current collector (a single battery layer forming step) and a step of preparing a power generating element in which a plurality of the single battery layers are electrically laminated in series and disposing the power generating element in an outer casing body (a laminate type battery preparing step) (Method I). Further, a method for producing a laminate type battery according to another embodiment may include a step of transferring a resistance reduction layer onto a current collector (a resistance reduction layer forming step 2). Thereafter, the above-described single battery layer forming step and the above-described laminate type battery preparing step are performed (Method II). A method for producing a laminate type battery according to still another embodiment may include a step of applying a coating liquid containing a conductive material onto a current collector to forma resistance reduction layer (a resistance reduction layer forming step 3). Thereafter, the single battery layer forming step and the laminate type battery preparing step are performed (Method III).

The laminate type battery obtained by the above-described methods is excellent in adhesiveness between the current collector and the resistance reduction layer. As a result, the electrical contact between the conductive filler in the resin current collector and the resistance reduction layer is efficiently and stably formed, the contact resistance is further reduced, and excellent output performance can be exhibited.

Incidentally, when the resistance reduction layer has a laminate configuration of two or more layers, at least two layers of the resistance reduction layer are preferably pasted to each other by a conductive adhesive member. By performing pasting by using a conductive adhesive member, the in-plane variation of the contact resistance can be reduced. As the conductive adhesive member used at this time, the same conductive adhesive member as described in the above-described section (3) can be used and there is no particular limitation thereon.

The laminate type battery of the present invention produced as described above is suitably used in a lithium ion secondary battery. Herein, in the lithium ion secondary battery, known finding of the related art is appropriately employed for a main component member (an active material layer, an electrolyte layer, a current collecting plate, a lead, an outer casing body, or the like) other than the electrode. Further, the lithium ion secondary battery can be produced by a known production method of the related art.

Second Embodiment: Bipolar Type Secondary Battery

A second embodiment of the present invention relates to a bipolar type secondary battery as illustrated in FIG. 8. The bipolar type secondary battery is a bipolar type secondary battery obtained by sealing a power generating element, which includes a laminate formed by laminating a plurality of bipolar type electrodes in which a positive electrode active material layer is formed on one surface of a current collector and a negative electrode active material layer is formed on the other surface thereof via an electrolyte layer, inside an outer casing body. The bipolar type secondary battery includes a pair of outermost layer current collectors disposed at the outermost of the power generating element and a pair of current collecting plates interposing the power generating element and electrically connected to the outermost layer current collectors. Further, a resistance reduction layer is disposed at the surface side, on which the positive electrode active material layer or the negative electrode active material layer is not formed, of at least one of the outermost layer current collectors. That is, the resistance reduction layer is disposed at the outermost surface side of at least one of the outermost layer current collectors to be adjacent to a resin layer having conductivity. Further, the resistance reduction layer is formed by a conductive material which achieves a smaller internal resistance of the battery as compared to a case where the resin layer and the current collecting plate are connected without via the resistance reduction layer.

According to the conventional technique described in JP 2006-190649 A (corresponding to US 2008/220330 A) described above, it is proposed that the resin current collector containing a polymer material and a conductive filler is used for the purpose of improving the output density per weight of the secondary battery. However, when the resin current collector is used as an outermost layer current collector and a current collector other than the outermost layer current collector, it is found that the output characteristics of the battery are not sufficient. In this regard, the present inventors specifically investigated this problem, and as a result, they estimated that a high contact resistance between the resin current collector located at the outermost layer and the current collecting plate causes this problem and this high contact resistance greatly influences on an increase in the internal resistance of the battery. Therefore, the present inventors focused on the electrical contact between the resin current collector (the resin layer having conductivity) and the current collecting plate, and thus completed this embodiment.

According to the battery of this embodiment, in the bipolar type secondary battery, by providing the resistance reduction layer on the surface of the resin layer having conductivity of the outermost layer current collector, the internal resistance of the battery can be reduced and the output characteristics can be improved.

In the present specification, the bipolar type secondary battery is simply also referred to as the "bipolar type battery."

FIG. 8 is a schematic cross-sectional view illustrating a basic configuration of a flat (laminate) bipolar type lithium ion secondary battery (hereinafter, also simply referred to as the "bipolar type secondary battery") according to an embodiment of the present invention. Incidentally, the same symbols are given to members common to the members used in the battery of the first embodiment described by FIG. 1.

A bipolar type secondary battery 200 illustrated in FIG. 8 has a structure in which a power generating element 150 with a substantially rectangular shape, in which a charge and discharge reaction actually occurs, is sealed inside a laminate film 80 serving as a battery outer casing material.

As illustrated in FIG. 8, the power generating element 150 of the bipolar type secondary battery 200 of this embodiment includes a plurality of bipolar type electrodes 25 in which the positive electrode active material layer 2 electrically bonded to one surface of the current collector 7 is formed and the negative electrode active material layer 4 electrically bonded to the opposite surface of the current collector 7 is formed. In this embodiment, at least one of the positive electrode active material layer 2 and the negative electrode active material layer 4, preferably the negative electrode active material layer 4, and more preferably both of the positive electrode active material layer 2 and the negative electrode active material layer 4 are configured by an electrode active material layer illustrated in FIG. 8. Respective bipolar type electrodes 25 are laminated via the electrolyte layers 3 to form the power generating element 150. Incidentally, the electrolyte layers 3 each have a configuration in which an electrolyte is held at the center portion in the plane direction of a separator serving as a base material. In this configuration, each of the bipolar type electrodes 25 and each of the electrolyte layers 3 are alternately laminated such that the positive electrode active material layer 2 of one bipolar type electrode 25 faces the negative electrode active material layer 4 of another bipolar type electrode 25 adjacent to the one bipolar type electrode 25 via the electrolyte layer 3. That is, the electrolyte layer 3 is disposed to be interposed between the positive electrode active material layer 2 of one bipolar type electrode 25 and the negative electrode active material layer 4 of another bipolar type electrode 25 adjacent to the one bipolar type electrode 25.

The current collector 7, the positive electrode active material layer 2, the electrolyte layer 3, and the negative electrode active material layer 4 adjacent to each other form one single battery layer 110. Incidentally, the current collector 7 functions as both the positive electrode current collector of one single battery layer and the negative electrode current collector of another single battery layer adjacent to the single battery layer. Therefore, it can also be said that the bipolar type secondary battery 200 has a configuration in which the single battery layers 110 are laminated. Further, for the purpose of preventing liquid junction caused by leakage of the electrolyte liquid from the electrolyte layer 3, a sealing portion (an insulation layer) 16 is provided at the outer periphery of each of the single battery layer 110. Incidentally, only one surface of each of the outermost layer current collectors (an outermost layer positive electrode current collector 7a and an outermost layer negative electrode current collector 7b) located on the outermost of the power generating element 150 is provided with the positive electrode active material layer 2 or the negative electrode active material layer 4.

Further, in the bipolar type secondary battery 200 illustrated in FIG. 8, the positive electrode current collecting plate 30 is disposed to be adjacent to the positive electrode-side outermost layer current collector (the outermost layer positive electrode current collector 7a) and extends to be exposed on the outside of the laminate film 80, which is a battery outer casing material. Incidentally, the outermost layer positive electrode current collector 7a and the positive electrode current collecting plate 30 are disposed to be adjacent to each other via a resistance reduction layer 20c. Meanwhile, the negative electrode current collecting plate 40 is disposed to be adjacent to the negative electrode-side outermost layer current collector (the outermost layer negative electrode current collector 7b) and similarly extends to be exposed on the outside of the laminate film 80. Incidentally, the outermost layer negative electrode current collector 7b and the negative electrode current collecting plate 40 are disposed to be adjacent to each other via the resistance reduction layer 20c.

In this embodiment, the positive electrode-side and negative electrode-side outermost layer current collectors (the outermost layer positive electrode current collector 7a and the outermost layer negative electrode current collector 7b) each have a configuration in which the resistance reduction layers 20c are laminated on the surfaces thereof, respectively. The positive electrode active material layer 2 or the negative electrode active material layer 4 is formed at the inner surface side of each of the outermost layer current collectors (the outermost layer positive electrode current collector 7a and the outermost layer negative electrode current collector 7b), and the resistance reduction layers 20c each are disposed at the opposite side to be in contact with the positive electrode current collecting plate 30 or the negative electrode current collecting plate 40. However, the present invention is not limited only to such an embodiment, but may have a configuration in which the resistance reduction layer 20c is laminated on the surface of anyone of the positive electrode-side and negative electrode-side outermost layer current collectors.

In the bipolar type secondary battery 200 illustrated in FIG. 8, generally, the sealing portion 16 is provided on the periphery of each of the single battery layers 110. This sealing portion 16 is provided in order to prevent the contact between the current collectors 7 adjacent to each other inside the battery or occurrence of a short circuit caused by slight unevenness at the end portion of the single battery layer 110 in the power generating element 150. By providing such sealing portions 16, it is possible to ensure long-term reliability and safety and to provide the bipolar type secondary battery 200 with high quality.

The number of the single battery layers 110 laminated is adjusted depending on a desired voltage. Further, the number of the single battery layers 110 laminated in the bipolar type secondary battery 200 may be minimized as long as sufficient output can be ensured even when the thickness of the battery is made thinner as much as possible. In order to prevent external damage at the time of operation and avoid environmental degradation, the bipolar type secondary battery 200 preferably has a structure in which the power generating element 150 is sealed in the laminate film 80, which is a battery outer casing material, under reduced pressure, and the positive electrode current collecting plate 30 and the negative electrode current collecting plate 40 are exposed on the outside of the laminate film 80.

Incidentally, as respective members constituting the battery in this embodiment (each current collector, each active material layer, an electrolyte layer, a current collecting plate, a sealing portion, a laminate film, and the like), the same members as the respective members described in the above-described embodiment (the first embodiment) can be used.

Further, the same method as the method according to the first embodiment can also be employed as the method for producing a resistance reduction layer, and for other production methods, known methods related to the method for producing a bipolar type secondary battery can be suitably used.

<<Assembled Battery>>

An assembled battery is formed by connecting plural batteries. Specifically, at least two of them are used in series, in parallel, or in series and parallel. According to arrangement in series or parallel, it is possible to freely adjust the capacity and voltage.

It is also possible to form a detachable small-size assembled battery by connecting plural batteries in series or in parallel. Further, by connecting again plural detachable small-size assembled batteries in series or parallel, an assembled battery having high capacity and high output, which is suitable for a power source or an auxiliary power source for operating a vehicle requiring a high volume energy density and a high volume output density, can be formed. The number of the connected batteries for producing an assembled battery or the number of the stacks of a small-size assembled battery for producing an assembled battery with high capacity may be determined depending on the capacity or output of a battery of a vehicle (electric vehicle) on which the battery is mounted.

<<Vehicle>>

The lithium ion secondary battery including the above-described electrode can be preferably used as a power source or as an auxiliary power source for operating a vehicle, such as an electric vehicle, a hybrid electric vehicle, a fuel cell electric vehicle, or a hybrid fuel cell electric vehicle, in which a high energy density per mass, a high output density per mass, and the like are required.

Specifically, the battery or an assembled battery formed by combining plural batteries can be mounted on a vehicle. By mounting such a battery, a plug-in hybrid electric vehicle with a long EV driving distance and an electric vehicle with a long driving distance per charge can be achieved. The battery or an assembled battery formed by combining plural batteries can be used for, for example, a vehicle such as a hybrid car, a fuel cell electric car, and an electric car (including a two-wheel vehicle (motor bike) or a three-wheel vehicle in addition to all four-wheel vehicles (an automobile, a truck, a commercial vehicle such as a bus, a compact car, or the like)). However, the use is not limited to a vehicle, and it can be applied to various power sources of other transportation means, for example, a moving object such as an electric train, and it can be also used as a power source for loading such as an uninterruptable power source device.

EXAMPLES

The effects of the present invention will be described by means of Examples and Comparative Examples described below. However, the technical scope of the present invention is not limited only to the following Examples. Incidentally, hereinafter, unless otherwise stated, operations were conducted at room temperature (25° C.)

Example 1-1

(1) Preparation of Resin Current Collector
(a) Preparation of Resin Layer 75 parts by mass of polypropylene (trade name "SunAllomer (registered trademark) PL500A," manufactured by SunAllomer Ltd.), 20 parts by mass of acetylene black (AB) (trade name "DENKA BLACK (registered trademark) HS-100," manufactured by Denka Company Limited, average particle diameter of primary particles: 36 nm), and 5 parts by mass of dispersant (manufactured by Sanyo Chemical Industries, Ltd., trade name "UMEX (registered trademark) 1001," maleic anhydride modified polypropylene) were melted and kneaded using a pelletizer under conditions including 180° C., 100 rpm, and a retention time of 10 minutes to obtain a pellet for a resin current collector. The obtained pellet for a resin current collector was used and subjected to rolling by a heat pressing device to obtain a resin layer having a thickness of 100 μm (also referred to as "20 wt % AB-PP").

(b) Formation of Resistance Reduction Layer

A resistance reduction layer formed by Ni was formed on one surface of the resin layer by a sputtering method. Further, a product obtained by forming resistance reduction layers on both surfaces of the resin layer was prepared for the contact resistance measurement. At this time, the thickness of the Ni layer (the metal thin film) was adjusted to 200 nm (one surface).

(2) Preparation of Laminate Type Secondary Battery (a) Preparation of Each Component Member (Preparation of Positive Electrode Active Material Layer)

As a skeleton material used for a positive electrode active material layer, foamed aluminum (nominal pore size: 600 μm, porosity: 90%, thickness: 1 mm) manufactured by Mitsubishi Materials Corporation was used.

For production of the positive electrode active material layer, $LiCoO_2$ (LCO) (trade name "CELLSEED C-8G" manufactured by Nippon Chemical Industrial CO., LTD.) as an active material, acetylene black (AB) (trade name "DENKA BLACK (registered trademark) HS-100," manufactured by Denka Company Limited, average particle diameter of primary particles: 36 nm) as a conductive aid, polyvinylidene fluoride (PVdF) as a binder, and N-methyl-2-pyrrolidone (NMP) as a solvent were used to prepare an electrode slurry. At this time, the electrode slurry having LCO:AB:PVdF=90:5:5 (mass ratio) was prepared. A predetermined amount of the obtained electrode slurry was applied to foamed aluminum on the PET film, which had been cut into a size of 6 cm×6 cm in advance, dried, and slightly pressed to obtain a positive electrode active material layer. Incidentally, coating was performed using a simplified die coater. The surface density of $LiCoO_2$ (LCO) at this time was 40 mg/cm$^2$.

(Preparation of Negative Electrode Active Material Layer)

A negative electrode active material layer was prepared in the same manner as in preparation of the positive electrode active material layer, except that the following change was conducted. As a skeleton material, nickel-plated foamed urethane (Model No. Si-70-500T, thickness: 0.7 mm) manufactured by SEIREN CO., LTD. was cut into a size of 6.5 cm×6.5 cm and used. As the negative electrode active material, hard carbon (trade name "Carbotron (registered trademark) PS (F)," manufactured by Kureha Battery Materials Japan, abbreviated as "HC") was used to prepare an electrode slurry having HC:PVdF=90:10 (mass ratio). This electrode slurry was applied to the nickel-plated foamed urethane and dried. The surface density of the hard carbon (HC) at this time was 20 mg/cm$^2$.

(b) Preparation of Battery (Preparation of Six-Cell Laminate Type Battery)

First, a single battery layer (a single cell unit) of the laminate type battery was prepared as follows. First, the resin current collector prepared as described above (20 wt % AB-PP, thickness: 100 μm, having a Ni layer formed on one surface) was cut into a size of 8.0 cm×8.0 cm. A frame PP film for sealing (thickness: 100 μm) which has an outer side size of 9.0 cm×9.0 cm and a hole having a size of 7.0 cm×7.0 cm at the inner side was pasted on the periphery of the resin current collector (the surface on which the Ni layer is not formed) by a heat sealer. Two sets of the resin current collector pasted with the seal film in this way were prepared.

Next, the resin current collector film (attached with the seal film), the positive electrode active material layer, the two separators (microporous polypropylene films each having a size of 7.5 cm×7.5 cm and a thickness of 25 μm), the negative electrode active material layer, and the resin current collector film (attached with the seal film), which had been prepared as described above, were laminated in this order to thereby form a laminate. Incidentally, at this time, the Ni layer was laminated so as to be disposed at the outside of the laminate (that is, the opposite side to a side at which the positive electrode active material layer or the negative electrode active material layer is disposed).

Regarding the laminate prepared as described above, three sides of the PP film (the seal film) were heat-sealed. After the heat-sealed film was dried at 80° C. for one day by vacuum heating, a predetermined amount of an electrolyte liquid was injected and the remaining one side was vacuum heat-sealed to thereby form a single battery layer (a single cell). At this time, as the electrolyte liquid, a solution obtained by dissolving 1 M of $LiPF_6$ in a mixed solvent of ethylene carbonate (EC) and dimethyl carbonate (DMC) (volume ratio 3:7) was used.

Six sets of the single battery layer (the single cell) prepared as described above were laminated so as to be electrically connected in series, thereby forming a power generating element. At this time, a nickel plate for negative electrode-side electric current extraction was disposed below (at the negative electrode side of) the laminated six sets of the single battery layer (the power generating element). Meanwhile, an aluminum plate for positive electrode-side electric current extraction was disposed at the upper portion (at the positive electrode side of) of the laminated single battery layer. Then, the laminated six sets of the single battery layer was housed by using a material for an aluminum laminate pack in which two terminals for positive and negative electrodes are exposed on the outside from one side and three sides are opened, and heat sealing was performed except one side of this aluminum laminate pack. Subsequently, the remaining one side was vacuum-sealed so that atmospheric pressure was applied to the laminate type battery cell. Through the above-described procedures, a laminate type battery 1-1 having the configuration illustrated in FIG. 1 was obtained.

Example 1-2

A laminate type battery 1-2 was prepared in the same manner as in Example 1-1, except that in Example 1-1, a titanium (Ti) layer was formed instead of the Ni layer formed on the outer surface of the resin current collector. Incidentally, at this time, the Ti layer was formed by vapor deposition and the thickness thereof was adjusted to 200 nm.

Example 1-3

A laminate type battery 1-3 was prepared in the same manner as in Example 1-1, except that in Example 1-1, a resistance reduction layer using acetylene black (AB) as described below was formed instead of the Ni layer formed on the outer surface of the resin current collector.

A resin current collector provided with a resistance reduction layer using AB was prepared as follows. First, a dispersion liquid was prepared by dispersing acetylene black (AB) (trade name "DENKA BLACK (registered trademark) HS-100", manufactured by Denka Company Limited, average particle diameter of primary particles: 36 nm) in N-methyl-2-pyrrolidone (NMP) (AB concentration: 3% by mass). Next, this dispersion liquid was applied onto a polyimide (Kapton (registered trademark), manufactured by DU PONT-TORAY CO., LTD.) film such that an applied amount (surface density) of acetylene black became 0.25 mg/cm$^2$. Thereafter, drying was performed at 90° C. for 3 hours to form a coating film. Subsequently, the coating film was pasted on one surface of the resin current collector, and after hot pressing roll at 180° C. was applied, the polyimide film was removed. Accordingly, an AB layer (thickness: about 1 µm) serving as the resistance reduction layer was formed on one surface of the resin current collector.

Example 1-4

A laminate type battery 1-4 was prepared in the same manner as in Example 1-1, except that in Example 1-1, a resistance reduction layer using carbon nanotube (CNT) as described below was formed instead of the Ni layer formed on the outer surface of the resin current collector.

A resin current collector provided with a resistance reduction layer using CNT was prepared as follows. First, 7 parts by mass of carbon nanotube (manufactured by Cnano Technology Limited, trade name: FloTube 9000, average diameter: 10 to 15 nm, average fiber length: 10 µm) was mixed under stirring with 70 parts by mass of trimethylol propane triacrylate, 18 parts by mass of tetraethylene glycol diacrylate, and 5 parts by mass of t-butyl peroxypivalate as a polymerization initiator and dispersed to prepare a dispersion liquid. Next, this dispersion liquid was applied onto the resin current collector such that the total amount of CNT and the resin (a copolymer of trimethylol propane triacrylate and tetraethylene glycol diacrylate) became 1.5 mg/cm$^2$. Thereafter, polymerization was performed by the operation of holding the obtained product at 75° C. for 2.5 hours, thereby forming a CNT layer (thickness: about 20 µm) serving as a resistance reduction layer. Incidentally, in this example, after the respective single battery layers were superimposed, the operation of holding the obtained product at 45° C. for 1 hour was further performed for the purpose of compatibility between the laminated layers to prepare a laminate type battery 1-4.

Example 1-5

A laminate type battery 1-5 was prepared in the same manner as in Example 1-4, except that in Example 1-4, conditions when the resistance reduction layer was formed were changed as follows.

For the material of the dispersion liquid for forming the resistance reduction layer, the components other than CNT were changed. Specifically, 7 parts by mass of carbon nanotube (the same carbon nanotube as in Example 1-4) was mixed under stirring with 72 parts by mass of 2-ethylhexyl acrylate, 4 parts by mass of acrylic acid, 15 parts by mass of vinyl acetate, and 3 parts by mass of t-butyl peroxypivalate serving as a polymerization initiator and then dispersed to thereby prepare a dispersion liquid. This dispersion liquid was applied onto the resin current collector such that the total amount of CNT and the resins (2-ethylhexyl acrylate, acrylic acid, and vinyl acetate) became 1.5 mg/cm$^2$. Thereafter, polymerization was performed by the operation of holding the obtained product at 75° C. for 2.5 hours, thereby forming a CNT layer (thickness: about 20 µm) serving as a resistance reduction layer.

Example 1-6

A laminate type battery 1-6 was prepared in the same manner as in Example 1-5, except that in Example 1-5, conditions when the resistance reduction layer was formed were changed as follows.

The material of the dispersion liquid for forming the resistance reduction layer was changed. Specifically, a dispersion liquid was prepared by dispersing 20 parts by mass of acetylene black (AB) (the same acetylene black as in Example 1-3) and 80 parts by mass of pressure sensitive adhesive (manufactured by Sanyo Chemical Industries, Ltd.: POLYTHICK AH-311) in 500 parts by mass of toluene. This dispersion liquid was applied onto the resin current collector such that the total amount of AB and the pressure sensitive adhesive became 2.0 mg/cm$^2$. According to this, an AB layer (thickness: about 20 µm) serving as the resistance reduction layer was formed. Incidentally, in this example, each single battery layer was prepared by using the resin current collector obtained after drying the solvent (toluene) at 110° C., and then the single battery layers were laminated to prepare a laminate type battery 1-6.

Comparative Example 1-1

Figure 3:
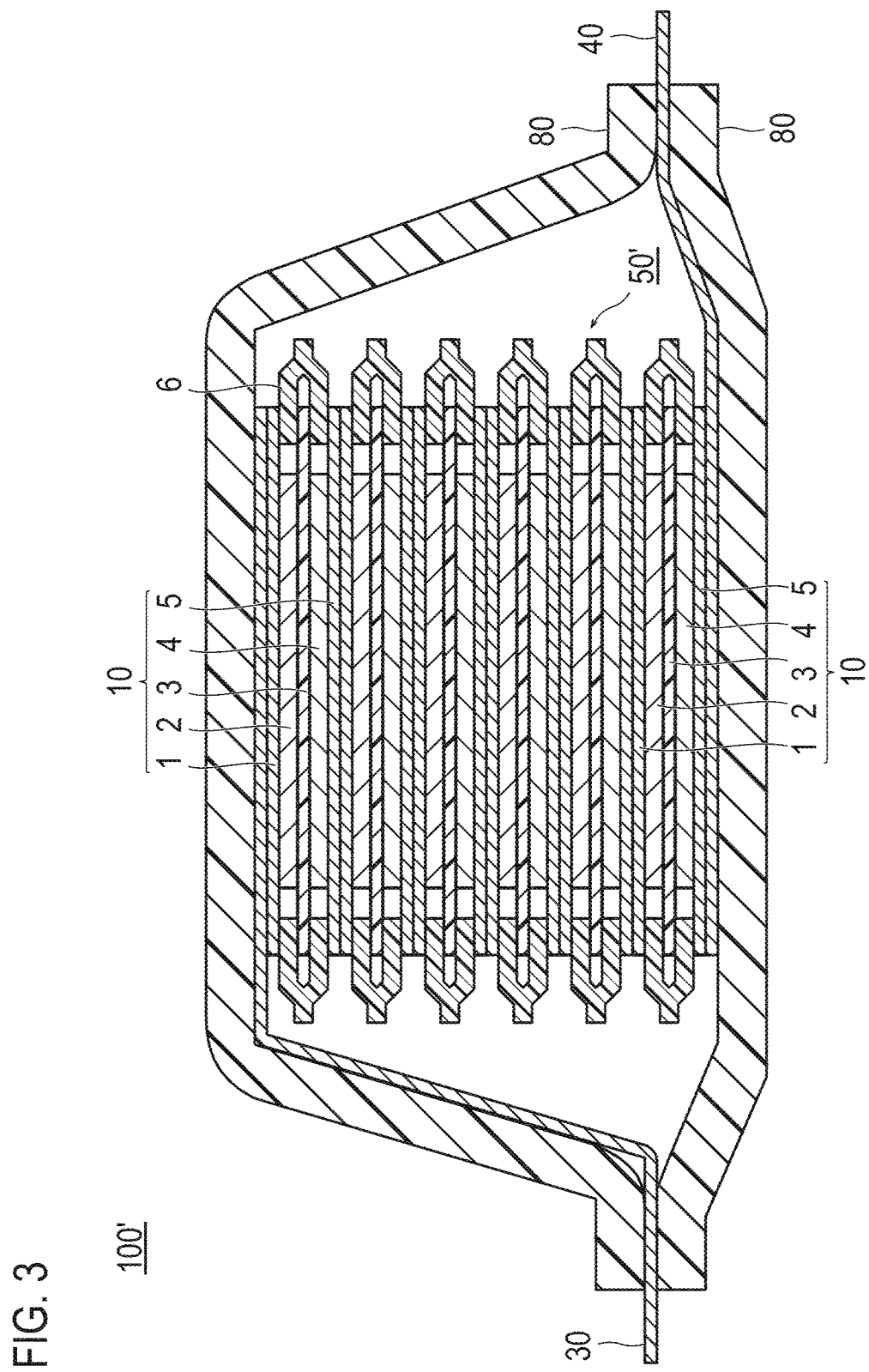
FIG. 3 is a cross-sectional view schematically illustrating a laminate type battery according to Comparative Example of the present invention.

A comparative laminate type battery 1-1 was prepared in the same manner as in Example 1-1, except that in Example 1-1, the Ni layer was not formed on the surface of the resin current collector. That is, a laminate type battery having the configuration illustrated in FIG. 3 was prepared.

<Measurement of Contact Resistance Between Resistance Reduction Layer and Resin Layer>

The measurement of the contact resistance between the resistance reduction layer and the resin layer was performed on Examples and Comparative Example described above. A resin current collector sample provided with a resistance reduction layer (a current collector sample for contact resistance measurement) was interposed by two gold-plated discs each having a diameter of 20 mm and a constant load of 1 kg/cm$^2$ was applied to the sample. A resistance value of the real axis at a frequency of 1061 Hz when the frequency in an AC impedance measurement apparatus was decreased from 10 kHz by a four-terminal method so that the real number component of impedance became sufficiently constant was employed. Regarding the bulk resistance of only the resin layer, a strip-shaped sample with a width of 1 cm was prepared and then the resistance measurement of the sample was performed by a four-terminal method in the same manner. Further, although a value (0.013Ω) of the bulk resistance of the resin current collector on the basis of an area is small, the contact resistance on the one surface was calculated by formally subtracting the value of the bulk resistance from the measured value (the measured value of the resin current collector sample provided with the resistance reduction layer). The results thereof are presented in Table 1. Incidentally, since the resistance value to be measured is calculated from the formula: (the bulk resistance of the resin current collector+2×the contact resistance (the resin current collector/the resistance reduction layer)+2× the contact resistance (the resistance reduction layer/the gold-plated disc)), a value obtained by subtracting the bulk resistance of the resin current collector from the measured resistance value and then dividing the obtained value by 2 is presented as the contact resistance in Table 1. Since the contact resistance (the resistance reduction layer/the gold-plated disc) is relatively small, this value obtained as described above can be considered to substantially correspond to the contact resistance (the resin current collector/the resistance reduction layer).

<Measurement of Internal Resistance of Battery>

The internal resistance on the laminate type batteries prepared in Examples and Comparative Examples described above was evaluated as follows.

The capacity of the positive electrode material of the single battery layer (single cell) unit was regarded as 145 mAh/g, and charging was performed at a current rate of 0.1 C up to 24.6 V (4.1 Vin average per single cell) by CC-CV for 15 hours. Subsequently, after discharging was performed at 0.1 C by CC with 15.0 V cutoff, charging was performed again under the same conditions to measure the AC impedance, thereby obtaining the resistance value at 0.1 Hz. The results thereof are presented in Table 1. Incidentally, the symbol "-" in the table indicates that the resistance reduction layer is not formed so that the measurement is not performed.

TABLE 1

| | Form of resistance reduction layer | Contact resistance [Ω] | Thickness of resistance reduction layer | Internal resistance [Ω] |
|---|---|---|---|---|
| Example 1-1 | Ni sputtering | 0.12 | 200 nm | 22.9 |
| Example 1-2 | Ti vapor deposition | 0.25 | 200 nm | 23.1 |
| Example 1-3 | AB pasting | 0.50 | 1 μm | 23.1 |
| Example 1-4 | CNT-containing adhesive | 0.35 | 20 μm | 22.5 |
| Example 1-5 | CNT-containing pressure sensitive adhesive | 0.37 | 20 μm | 23.5 |
| Example 1-6 | AB-containing pressure sensitive adhesive | 0.28 | 20 μm | 23.0 |
| Comparative Example 1-1 | None | — | — | 32.6 |

From the result of Table 1, it is shown that the internal resistance is reduced in the form in which the single battery layers (single cells) each having the resistance reduction layer formed thereon are laminated (Examples) as compared to the form in which the resistance reduction layer is not formed (Comparative Example). This result means that the battery according to the present invention is excellent in output characteristics.

More specifically, Example 1-4 and Comparative Example 1-1 had the maximum difference in the internal resistance value, and the internal resistance value of Comparative Example 1-1 was about 1.4 times as large as the internal resistance value of Example 1-4.

Further, roughly, the internal resistance value is associated with the contact resistance value of the resistance reduction layer and there is tendency that the internal resistance value is reduced as the contact resistance value is reduced.

From the result of Example 1-1, it is estimated that the internal resistance can be reduced by using Ni having a small ionization tendency. Meanwhile, in Example 1-2, it is considered that the contact resistance with the resin current collector is reduced due to the properties of Ti itself (excellent corrosion resistance and less formation of a thick oxide film) although the ionization tendency of Ti is not small.

Furthermore, it is also shown that the effect of reducing the internal resistance value can be obtained in various forms (pasting, using an adhesive, and the like) also by using a conductive carbon material as a material for forming the resistance reduction layer.

Example 2-1

(1) Preparation of (Outermost Layer) Current Collector
(a) Preparation of Resin Layer 75% by mass of polypropylene (PP; SunAllomer PL500A (trade name), manufactured by SunAllomer), 20% by mass of acetylene black (AB; DENKA BLACK (registered trademark) NH-100, manufactured by Denka Company Limited), and 5% by mass of dispersant (UMEX 1001, manufactured by Sanyo Chemical Industries, Ltd.) were melted and kneaded by a pelletizer under conditions including 180° C., 100 rpm, and a retention time of 10 minutes to obtain a pellet for a resin current collector. The obtained pellet for a resin current collector was used to form a film by an extruder, thereby obtaining a resin layer having a thickness of 100 μm (20% by mass AB/PP). Incidentally, the amount of each of the components represents a mixing ratio, and the total of polypropylene, acetylene black, and the dispersant is 100% by mass.

Incidentally, in a bipolar type secondary battery to be described below, only the resin layer (which is not provided with a resistance reduction layer to be described below) was used as the current collector other than the outermost layer current collector.

(b) Formation of Resistance Reduction Layer

A resistance reduction layer formed by Ni (thickness: 200 nm) was formed by the same method described in (b) Formation of Resistance Reduction Layer of [Example 1-1] described above to complete an outermost layer current collector. Further, a resistance reduction layer formed by Ni (thickness: 200 nm) was formed by sputtering on both surfaces of the resin layer in the same manner as in [Example 1-1] described above, and then was used as a current collector for contact resistance measurement to be described later.

(2) Preparation of Bipolar Type Secondary Battery
(a) Preparation of Each Component Member A current collector formed only from the aforementioned resin layer (which is not provided with a resistance reduction layer) was cut into a size of 8.0 cm×8.0 cm, and a frame PP film for sealing which has an outer side size of 9.0 cm×9.0 cm and a hole having a size of 7.0 cm×7.0 cm at the inner side was pasted on both surfaces of the cut current collector by a heat sealer.

Similarly, the aforementioned outermost layer current collector was cut into a size of 8.0 cm×8.0 cm, and a frame PP film for sealing which has an outer side size of 9.0 cm×9.0 cm and a hole having a size of 7.0 cm×7.0 cm at the inner side was pasted on the resin layer side (a surface side on which a resistance reduction layer is not formed) by a heat sealer.

A positive electrode active material layer was formed by the same method as in [Example 1-1], except that the conductive aid was changed and DENKA BLACK (registered trademark) NH-100 was used instead of DENKA BLACK (registered trademark) HS-100 in the method described in (Preparation of Positive Electrode Active Material Layer) of [Example 1-1] described above. Incidentally, the surface density of $LiCoO_2$ in the positive electrode active material layer was 40 mg/cm$^2$.

Further, a negative electrode active material layer was formed by the same method described in (Preparation of Negative Electrode Active Material Layer) of [Example 1-1] described above.

(b) Preparation of Battery

The outermost layer current collector, the positive electrode active material layer, the two separators (microporous polypropylene films each having a size of 7.5 cm×7.5 cm), the negative electrode active material layer, the current collector (which is not provided with a resistance reduction layer), the positive electrode active material layer, the two separators, the negative electrode active material layer, and the outermost layer current collector, which had been prepared as described above, were laminated in this order. Incidentally, the outermost layer current collector was disposed such that the resin layer was in contact with the positive electrode active material layer or the negative electrode active material layer. Then, three sides of the PP film for sealing were heat-sealed and the heat-sealed film was dried at 80° C. for one day by vacuum heating.

As an electrolyte liquid, a solution obtained by dissolving $LiPF_6$ in a mixed solvent of ethylene carbonate (EC):diethyl carbonate (DEC)=3:7 (volume ratio) at a concentration of 1 M was prepared. The electrolyte liquid was injected from the unsealed portion of the laminate, and then vacuum heat sealing was performed to prepare a power generating element formed from two single battery layers (two cells).

An Al plate having a thickness of 200 μm in which an elongated tab for electric current extraction remains was superimposed as the positive electrode current collecting plate onto the surface of the outermost layer current collector (the surface of the resistance reduction layer) at the side which is in contact with the positive electrode active material layer of this power generating element. Meanwhile, a Ni plate having a thickness of 200 μm in which an elongated tab for electric current extraction remains was superimposed as the negative electrode current collecting plate onto the surface of the outermost layer current collector (the surface of the resistance reduction layer) at the side which is in contact with the negative electrode active material layer. Then, a seal film was wound around each elongated tab portion for electric current extraction and was extracted from the one side of an aluminum laminate film serving as the outer casing body, and the laminate film was sealed under reduced pressure, thereby completing a bipolar type secondary battery 2-1.

Example 2-2

A bipolar type secondary battery 2-2 was prepared in the same manner as in Example 2-1, except that a resistance reduction layer (thickness: 200 nm) formed by Ti was formed by vapor deposition in the formation of the resistance reduction layer.

Example 2-3

A bipolar type secondary battery 2-3 was prepared in the same manner as in Example 2-1, except that the method for connecting the power generating element and the current collecting plate was changed as follows in the preparation of the battery.

The surface of the outermost layer current collector (the surface of the resistance reduction layer) at the side which is in contact with the positive electrode active material layer of the power generating element and an Al plate having a thickness of 200 μm and serving as the positive electrode current collecting plate in which an elongated tab for electric current extraction remains were laminated via a conductive adhesive (CIRCUITWORKS, epoxy conductive adhesive CW2400). Similarly, the surface of the outermost layer current collector (the surface of the resistance reduction layer) at the side which is in contact with the negative electrode active material layer and a Ni plate having a thickness of 200 μm and serving as the negative electrode current collecting plate in which an elongated tab for electric current extraction remains were laminated via the above-described conductive adhesive. Then, a seal film was wound around each elongated tab portion for electric current extraction and was extracted from the one side of an aluminum laminate film serving as the outer casing body, and the laminate film was sealed under reduced pressure. Further, pressure of 1 atmospheric pressure was applied to the obtained product at room temperature (25° C.), and then the conductive adhesive was cured at normal temperature for one day, thereby completing a bipolar type secondary battery 2-3.

Example 2-4

A bipolar type secondary battery 2-4 was prepared by the same method as in Example 2-1, except that a resistance reduction layer (thickness: 200 nm) formed by Al was formed by sputtering on the surface of the resin layer in the formation of the resistance reduction layer.

Example 2-5

A bipolar type secondary battery 2-5 was prepared by the same method as in Example 2-1, except that a resistance reduction layer was formed by the same method as in [Example 1-6] on the surface of the resin layer in the formation of the resistance reduction layer.

Comparative Example 2-1

A comparative bipolar type secondary battery 2-1 was prepared by the same method as in Example 2-1, except that a resistance reduction layer was not formed in the formation of the outermost layer current collector.

Reference Example 1

A current collector for contact resistance measurement was prepared by the same method as in Example 2-1 (Example 1-1), except that a resistance reduction layer (thickness: 200 nm) formed by Cu was formed by sputtering on the surface of the resin layer in the formation of the resistance reduction layer.

Reference Example 2

A current collector for contact resistance measurement was prepared by the same method as in Example 2-1 (Example 1-1), except that a resistance reduction layer (thickness: 200 nm) formed by Fe was formed by vapor deposition on the surface of the resin layer in the formation of the resistance reduction layer.

<Measurement of Contact Resistance Between Resistance Reduction Layer and Resin Layer>

The evaluation was performed on Examples, Comparative Example, and Reference Examples described above in the same measurement method of the contact resistance performed in Example 1-1 described above.

Incidentally, the contact resistance was measured by using one obtained by superimposing the resin layer and the Al plate (thickness: 20 μm) instead of the current collector sample for contact resistance measurement, and as a result, the contact resistance was 64.0 [Ω].

<Measurement of Internal Resistance of Battery>

The internal resistance of each of the bipolar type batteries prepared in Examples and Comparative Example was evaluated as follows.

The bipolar type secondary battery was charged at a current rate of 0.1 C up to 8.4 V (single cell 4.2 V) by CC-CV for 15 hours, discharged at 0.1 C by CC with 5.0 V cutoff, and then the bipolar type secondary battery was charged again under the same conditions to measure the AC impedance. Further, the resistance value at 0.1 Hz was regarded as the internal resistance of the battery. The results thereof are presented in the following Table 2.

TABLE 2

| | Resistance reduction layer (conductive material/formation method) | Contact resistance [Ω] | Internal resistance [Ω] | Remark |
|---|---|---|---|---|
| Example 2-1 | Ni/sputtering | 0.12 | 7.6 | |
| Example 2-2 | Ti/vapor deposition | 0.25 | 7.7 | |
| Example 2-3 | Ni/sputtering | 0.12 | 7.7 | Outermost layer current collector and current collecting plate were fixed to each other via conductive adhesive |
| Example 2-4 | Al/sputtering | 8.0 | 8.7 | |
| Example 2-5 | Acetylene black/coating | 9.2 | 9.9 | |
| Comparative Example 2-1 | None | — | 13.0 | |
| Reference Example 2-1 | Cu/sputtering | 0.18 | | |
| Reference Example 2-2 | Fe/vapor deposition | 0.50 | | |

From the result of Table 2 described above, it is shown that the internal resistance is significantly reduced in the battery of the present invention using the outermost layer current collector which has the resistance reduction layer. This result means that the battery of the present invention is excellent in output characteristics. The reason for this is considered that an increase in contact resistance caused by unevenness of the surface of the resin layer having conductivity is suppressed by providing the resistance reduction layer.

It is shown that, particularly, the internal resistance of the battery is reduced in the batteries of Examples 2-1 to 2-3 in which the contact resistance between the resistance reduction layer and the resin layer is 2 [Ω] or less as compared to Example 2-4, and the batteries of Example 2-1 to 2-3 are further excellent in output characteristics. The reason for this is considered that Ni and Ti constituting the resistance reduction layer of each of Example 2-1 to 2-3 are less likely to form an oxide film and thus the contact resistance is further suppressed.

Incidentally, it is found that the outermost layer current collector and the current collecting plate are fixed via the conductive adhesive in the battery of Example 2-3, but as compared to Example 2-1, there is no large difference in internal resistance (output characteristics) of the battery regardless of the presence of the conductive adhesive.

Furthermore, from the result of Example 2-5, it is also shown that the effect of reducing the internal resistance value can be also obtained in various forms (pasting, using an adhesive, and the like) by using a conductive carbon material as a material for forming the resistance reduction layer.

The present application is based on Japanese Patent Application No. 2014-170622 filed on Aug. 25, 2014 and Japanese Patent Application No. 2014-170626 filed on Aug. 25, 2014, the disclosure of which is hereby incorporated by reference in its entirety.

REFERENCE SIGNS LIST 100, 200, 100' Laminate type battery (laminate type lithium ion secondary battery)
80 Laminate film (battery outer casing body)
50, 150, 50' Power generating element
10, 110 Single battery layer
1 Positive electrode current collector
2 Positive electrode active material layer
3 Electrolyte layer
4 Negative electrode active material layer
5 Negative electrode current collector
6, 16 Sealing portion
7 Current collector
7a Outermost layer positive electrode current collector
7b Outermost layer negative electrode current collector
20a, 20b, 20c Resistance reduction layer
25 Bipolar type electrode
30 Positive electrode current collecting plate
40 Negative electrode current collecting plate
58 Positive electrode tab
59 Negative electrode tab

The invention claimed is:

1. A laminate type battery comprising:
a power generating element formed by electrically laminating in series a plurality of single batteries in which a first single battery is formed by sequentially laminating a positive electrode current collector, a positive electrode active material layer, an electrolyte layer, a negative electrode active material layer, and a negative electrode current collector; and
an outer casing body inside which the power generating element is disposed, wherein
at least one of the positive electrode current collector or the negative electrode current collector comprises a resin layer having conductivity,
the first single battery comprising the resin layer is electrically connected to an adjacent single battery via at least one resistance reduction layer,
the at least one resistance reduction layer comprises a metal having a thickness of 0.05 μm to 1 μm,
the at least one resistance reduction layer abuts the resin layer of the first single battery,
the at least one resistance reduction layer abuts a resin layer of the adjacent single battery, and
a contact resistance of the at least one resistance reduction layer with the resin layer of the adjacent single battery is 2Ω or less.

2. The laminate type battery according to claim 1, wherein the resistance reduction layers each independently comprise at least one conductive material selected from the group consisting of conductive carbon, iron (Fe), cadmium (Cd), cobalt (Co), nickel (Ni), tin (Sn), lead (Pb), antimony (Sb), bismuth (Bi), copper (Cu), silver (Ag), palladium (Pd), iridium (Ir), platinum (Pt), gold (Au), titanium (Ti), zirconium (Zr), tantalum (Ta), niobium (Nb), or an alloy comprising, as a main component, at least one element selected from iron (Fe), cadmium (Cd), cobalt (Co), nickel (Ni), tin (Sn), lead (Pb), antimony (Sb), bismuth (Bi), copper (Cu), silver (Ag), palladium (Pd), iridium (Ir), platinum (Pt), gold (Au), titanium (Ti), zirconium (Zr), tantalum (Ta), or niobium (Nb).

3. The laminate type battery according to claim 1, wherein the resistance reduction layers each independently are formed by at least one material selected from the group consisting of nickel (Ni), copper (Cu), or titanium (Ti).

4. A laminate type battery comprising:
a power generating element formed by electrically laminating in series a plurality of single battery layers which are formed by sequentially laminating a positive electrode current collector, a positive electrode active material layer, an electrolyte layer, a negative electrode active material layer, and a negative electrode current collector;
an outer casing body inside which the power generating element is disposed; and
a pair of current collecting plates interposing the power generating element and electrically connected to outermost layer current collectors disposed at the outermost of the power generating element, wherein
at least one of the outermost layer current collectors comprises a resin layer having conductivity,
a resistance reduction layer is disposed between the resin layer and a current collecting plate and abuts the resin layer,
a contact resistance of a conductive material which forms the resistance reduction layer with the resin layer is 2Ω or less,
wherein the resistance reduction layer comprises a metal having a thickness of 0.05 μm to 1 μm.

5. The laminate type battery according to claim 1, wherein the resistance reduction layer is formed by at least one method selected from the group consisting of vapor deposition, sputtering, ion plating, or plating.

6. The laminate type battery according to claim 4, wherein the resistance reduction layer is formed by at least one material selected from the group consisting of nickel (Ni), copper (Cu), or titanium (Ti).

7. The laminate type battery according to claim 1, wherein the resistance reduction layer comprises a metal having a thickness of 0.1 μm to 0.5 μm.

8. The laminate type battery according to claim 4, wherein the resistance reduction layer comprises a metal having a thickness of 0.1 μm to 0.5 μm.

* * * * *